US010638385B2

(12) United States Patent
Baek et al.

(10) Patent No.: US 10,638,385 B2
(45) Date of Patent: Apr. 28, 2020

(54) METHOD AND APPARATUS FOR TRANSMITTING AND RECEIVING DATA IN WIRELESS COMMUNICATION SYSTEM

(71) Applicant: Samsung Electronics Co., Ltd, Suwon-si (KR)

(72) Inventors: Sang-Kyu Baek, Yongin-si (KR); June Hwang, Incheon (KR); Hyun-Jeong Kang, Seoul (KR); Sang-Wook Kwon, Suwon-si (KR); Anil Agiwal, Suwon-si (KR); Kyung-Kyu Kim, Suwon-si (KR); Young-Joong Mok, Suwon-si (KR); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 15/754,286

(22) PCT Filed: Aug. 22, 2016

(86) PCT No.: PCT/KR2016/009258
§ 371 (c)(1),
(2) Date: Feb. 21, 2018

(87) PCT Pub. No.: WO2017/034269
PCT Pub. Date: Mar. 2, 2017

(65) Prior Publication Data
US 2018/0249388 A1    Aug. 30, 2018

(30) Foreign Application Priority Data

Aug. 21, 2015 (IN) .......................... 4390/CHE/2015

(51) Int. Cl.
*H04W 84/04* (2009.01)
*H04W 36/08* (2009.01)
(Continued)

(52) U.S. Cl.
CPC ....... *H04W 36/02* (2013.01); *H04W 36/0069* (2018.08); *H04W 36/08* (2013.01);
(Continued)

(58) Field of Classification Search
None
See application file for complete search history.

(56) References Cited

U.S. PATENT DOCUMENTS

2013/0188575 A1   7/2013  Lee et al.
2013/0301439 A1*  11/2013 Heo ........................ H04W 4/90
                                                              370/252
(Continued)

FOREIGN PATENT DOCUMENTS

KR   10-2013-0085300 A   7/2013
KR   10-2015-0029652 A   3/2015
(Continued)

OTHER PUBLICATIONS

International Search Report dated Nov. 16, 2016 in connection with International Patent Application No. PCT/KR2016/009258.
(Continued)

*Primary Examiner* — Angel T Brockman

(57) ABSTRACT

Disclosed is a 5G or pre-5G communication system for supporting a data transmission rate higher than that of a 4G communication system, such as LTE. Disclosed is a method for receiving data in a wireless communication system, comprising the steps of: receiving, by a terminal, transmission point change information from a first base station connected to a gateway; receiving, by the terminal, the data transmitted from the gateway to the first base station through a second base station serving the terminal; and re-receiving, by the terminal, data, of which the transmission has failed, through a third base station according to a change of a transmission point from the second base station to the third (Continued)

base station on the basis of the transmission point change information, when data transmission from the second base station to the terminal has failed.

16 Claims, 23 Drawing Sheets

(51) Int. Cl.
*H04W 36/02* (2009.01)
*H04W 36/00* (2009.01)
*H04W 40/36* (2009.01)

(52) U.S. Cl.
CPC .......... *H04W 40/36* (2013.01); *H04W 36/023* (2013.01); *H04W 84/042* (2013.01)

(56) References Cited

U.S. PATENT DOCUMENTS

| | | | |
|---|---|---|---|
| 2014/0029570 A1 | 1/2014 | Lee et al. | |
| 2015/0131578 A1 | 5/2015 | Baek et al. | |
| 2015/0156802 A1 | 6/2015 | Morioka et al. | |
| 2015/0264601 A1* | 9/2015 | Cha .................. | H04W 36/0079 455/436 |
| 2015/0358886 A1 | 12/2015 | Qin | |

FOREIGN PATENT DOCUMENTS

| | | |
|---|---|---|
| KR | 10-2015-0048129 A | 5/2015 |
| KR | 10-2015-0055535 A | 5/2015 |
| WO | 2015065010 A1 | 5/2015 |
| WO | 2015074598 A1 | 5/2015 |

OTHER PUBLICATIONS

Written Opinion of the International Search Authority dated Nov. 16, 2016 in connection with International Patent Application No. PCT/KR2016/009258.

\* cited by examiner

METHOD AND APPARATUS FOR TRANSMITTING AND RECEIVING DATA IN WIRELESS COMMUNICATION SYSTEM

CROSS-REFERENCE TO RELATED APPLICATION(S) AND CLAIM OF PRIORITY

The present application is a 371 National Stage of International Patent Application No. PCT/KR2016/009258 filed on Aug. 22, 2016, which claims priority to Indian Patent Application No. 4390/CHE/2015 filed on Aug. 21, 2015, each of which are incorporated herein by reference into the present disclosure as if fully set forth herein.

TECHNICAL FIELD

The present disclosure relates to a method and apparatus for transmitting and receiving data in a wireless communication system.

BACKGROUND

To satisfy demands for wireless data traffic having increased since commercialization of 4th-Generation (4G) communication systems, efforts have been made to develop improved 5th-Generation (5G) communication systems or pre-5G communication systems. For this reason, the 5G communication system or the pre-5G communication system is also called a beyond-4G-network communication system or a post-Long-Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Meanwhile, future wireless communication systems are expected to need an extremely low latency less than several milliseconds, but current wireless communication systems do not support such a low latency less than several milliseconds due to a long packet retransmission delay, a handover interruption time, or a radio link failure. Therefore, to support a low latency, fast transmission point change and corresponding data path switch are needed.

SUMMARY

The present disclosure provides a method and apparatus for transmitting and receiving data in a wireless communication system to support a low latency.

The present disclosure also provides a method and apparatus for transmitting and receiving data in a wireless communication system to support fast transmission point change.

Moreover, the present disclosure provides a method and apparatus for transmitting and receiving data in a wireless communication system to support fast path switch.

According to an embodiment of the present disclosure, a method for receiving data in a wireless communication system includes receiving, by a user equipment (UE), transmission point change information from a first evolved NodeB (eNB) connected with a gateway (GW), receiving, by the UE, the data transmitted from the GW to the first eNB, through a second eNB serving the UE, and in case of a failure in transmission of data from the second eNB to the UE, re-receiving, by the UE, the data having failed to be transmitted, through a third eNB, as a transmission point is changed from the second eNB to the third eNB based on the transmission point change information.

According to an embodiment of the present disclosure, a method for transmitting data in a wireless communication system includes transmitting, by a first eNB connected with a GW, transmission point change information to a second eNB serving a UE, receiving, by the first eNB, data from the GW and transmitting the received data to the UE through the second eNB, in case of a failure in transmission of the data from the second eNB to the UE, changing a transmission point from the second eNB to the third eNB based on the transmission point change information, and re-transmitting the data having failed to be transmitted by the first eNB, to the UE through the third eNB.

According to an embodiment of the present disclosure, an apparatus for receiving data in a wireless communication system includes a transceiver configured to receive transmission point change information from a first eNB connected with a GW, to receive the data transmitted from the GW to the first eNB, through a second eNB serving the UE, in case of a failure in transmission of data from the second eNB to the UE, to re-receive the data having failed to be transmitted, through a third eNB, as a transmission point is changed from the second eNB to the third eNB based on the transmission point change information, and a controller configured to control the transceiver.

According to an embodiment of the present disclosure, a first evolved NodeB (eNB) for transmitting data in a wireless communication system includes a transceiver; and a controller for controlling the transceiver to transmit transmission point change information to a second eNB serving a user equipment (UE), to receive data from the GW and to transmit the received data to the UE through the second eNB, in case of a failure in transmission of the data from the second eNB to the UE, to change a transmission point from the second eNB to the third eNB based on the transmission point change information, and to re-transmit the data having failed to be transmitted by the first eNB, to the UE through the third eNB.

DETAILED DESCRIPTION

Figure 1:
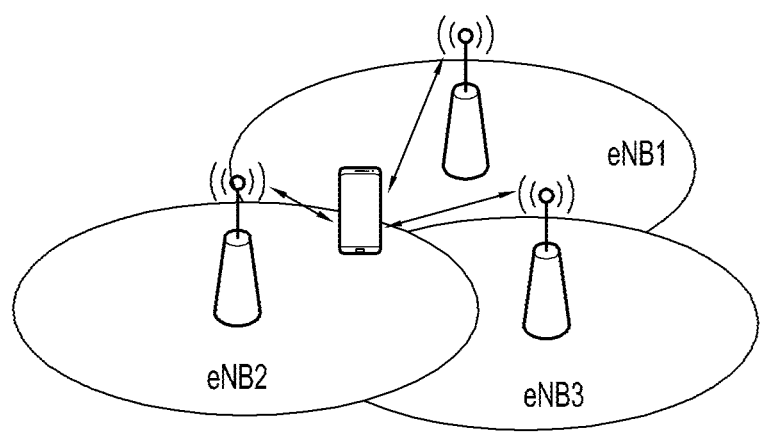
FIG. 1 illustrates a network environment to which an embodiment of the present disclosure is applied.

Hereinafter, various embodiments of the present disclosure will be disclosed with reference to the accompanying drawings.

When embodiments of the present disclosure are described, technical matters that are well known in a technical field of the present disclosure and are not directly related to the present disclosure will not be described. By omitting an unnecessary description, the subject matter of the present disclosure will be more clearly described without being obscured.

For the same reasons, some elements will be exaggerated, omitted, or simplified in the attached drawings. The size of each element does not entirely reflect the actual size of the element. In each drawing, an identical or corresponding element will be referred to as an identical reference numeral.

Advantages and features of the present disclosure and a method for achieving them will be apparent with reference to embodiments described below together with the attached drawings. However, the present disclosure is not limited to the disclosed embodiments, but may be implemented in various manners, and the embodiments are provided to complete the disclosure of the present disclosure and to allow those of ordinary skill in the art to understand the scope of the present disclosure. The present disclosure is defined by the category of the claims. Throughout the specification, an identical reference numeral will indicate an identical element.

It will be understood that each block of the flowchart and/or block diagram illustrations, and combinations of blocks in the flowchart and/or block diagram illustrations, may be implemented by computer program instructions. These computer program instructions may also be stored in a general-purpose computer, a special-purpose computer, or a processor of other programmable data processing devices, such that the instructions implemented the computer or the processor of the programmable data processing device produce a means for performing functions specified in the flowchart and/or block diagram block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In addition, each block represents a module, segment, or portion of code, which includes one or more executable instructions for implementing the specified logical function(s). It should also be noted that in other implementations, the function(s) noted in the blocks may occur out of the order. For example, two blocks shown in succession may, in fact, be executed substantially concurrently or the blocks may sometimes be executed in the reverse order, depending on the functionality involved.

In the current embodiment, the term '~unit', as used herein, denotes a software or hardware component, such as a Field Programmable Gate Array (FPGA) or Application Specific Integrated Circuit (ASIC), which performs certain tasks. However, the meaning of '~unit' is not limited to software or hardware. "Unit" may advantageously be configured to reside on the addressable storage medium and configured to reproduce one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and '~units' may be combined into fewer components and '~units' or further separated into additional components and '~units'. In addition, components and 'unit(s)' may be implemented to execute one or more CPUs in a device or a secure multimedia card.

Before a detailed description of the present disclosure is made, examples of interpretable meanings will be provided for several terms used herein. However, it should be noted that the meanings of the terms are not limited to the examples provided below.

A Base Station (BS) is an entity that communicates with a User Equipment (UE), and may also be referred to as a BS, a NodeB (NB), an eNodeB (eNB), an Access Point (AP), or the like.

The UE is an entity that communicates with the eNB, and may also be referred to as a UE, a device, a mobile station (MS), a mobile equipment (ME), a terminal, or the like.

FIG. 1 illustrates a network environment to which an embodiment of the present disclosure is applied.

As illustrated in FIG. 1, a method for transmitting and receiving data according to an embodiment of the present disclosure may be applied to a Long-Term Evolution (LTE)-based standalone network, and is also applicable to an mmWave-based standalone network.

Figure 2:
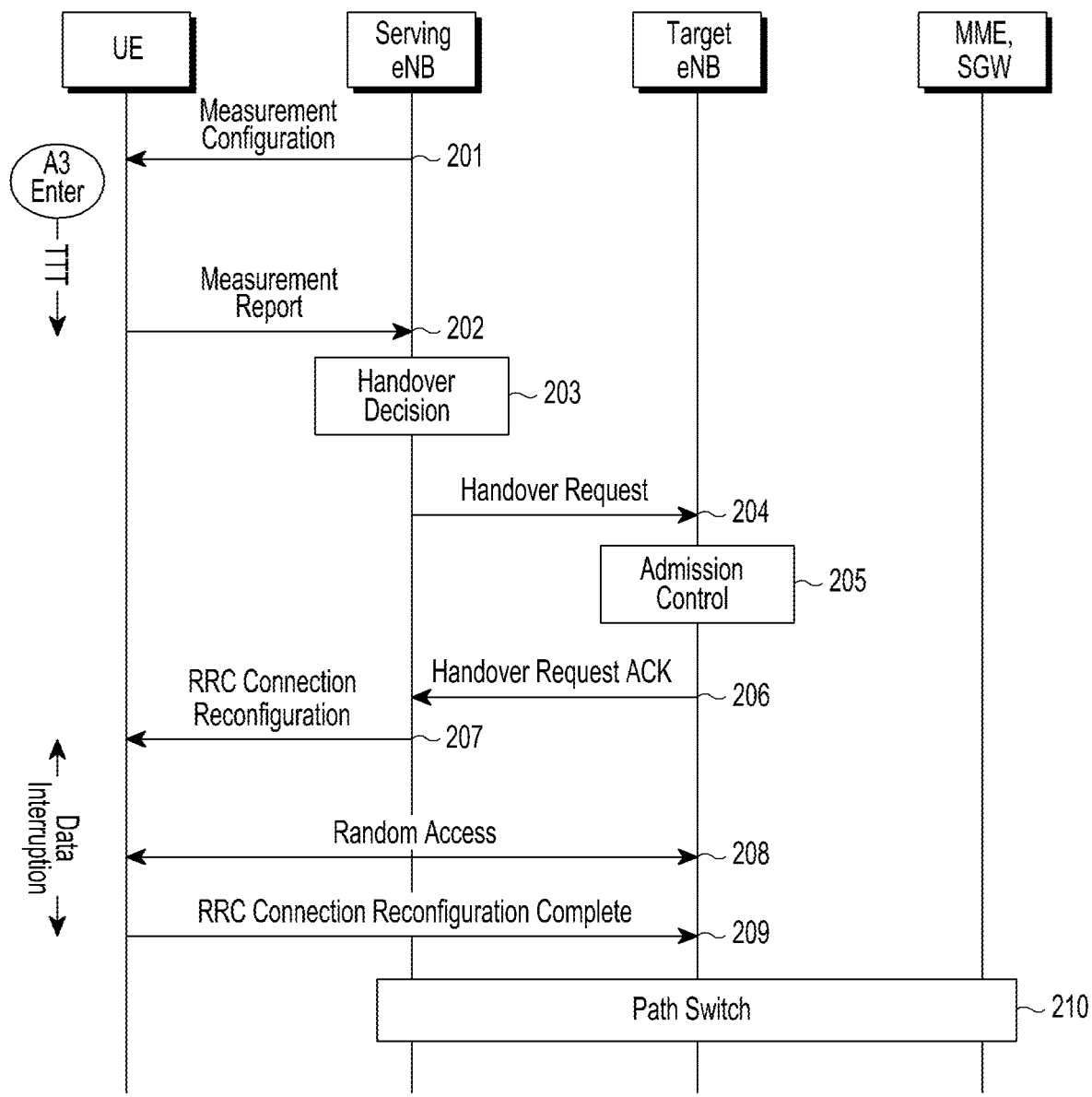
FIG. 2 illustrates a handover process in a general communication system.

FIG. 2 illustrates a handover process in a general LTE system.

Referring to FIG. 2, as a serving eNB that serves a UE transmits measurement configuration to a UE in operation 201, the UE transmits, in operation 202, a measurement report to the serving eNB which then decides whether to perform a handover based on the measurement report received from the UE in operation 203. For example, the serving eNB may decide to perform a handover if a received signal strength of the UE is less than a threshold value. The serving eNB having decided to perform the handover transmits a handover request to a target eNB in operation 204, and the target eNB decides whether to admit the handover in operation 205 and transmits a handover request response to the serving eNB in operation 206. The serving eNB having received the handover request response transmits a radio resource control (RRC) connection reconfiguration request to the UE in operation 207, and the UE performs a random-access process with the target eNB in operation 208 and completes the RRC connection reconfiguration. Then, a mobility management entity (MME) or a serving gate way (SGW) changes a data transmission path from the serving eNB to the target eNB in operation 210.

As such, in an inter-cell handover in a standalone system regardless of mmWave or low frequency, data interruption may occur, starting from release of a radio resource from a serving BS (or a serving eNB) until completion of an access to a new BS, i.e., from 207 through 209. If a time of the data interruption is longer than a latency that is sustainable in the system, a problem may occur. This problem may be solved by introducing a plurality of connections where one connection is gone while the other connection may be maintained for delivering data to the UE.

Figure 3:
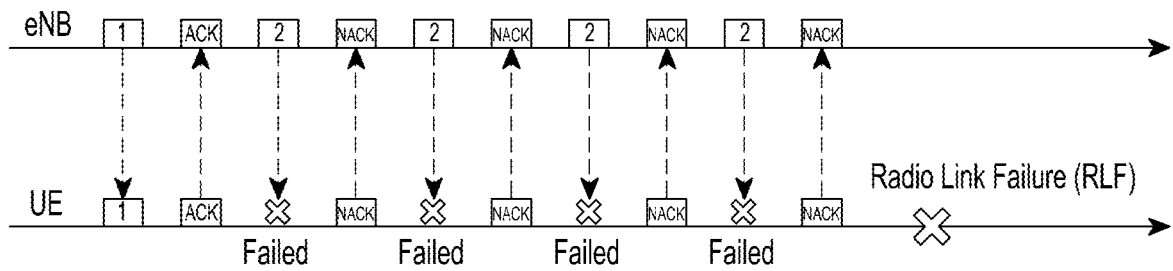
FIG. 3 illustrates data transmission and reception when a handover occurs in a general communication system.

FIG. 3 illustrates data transmission and reception when a handover occurs in a general communication system.

In data transmission from an eNB to a UE, sudden channel degradation may occur, such that consecutive data transmission failures may happen within relatively short duration, as illustrated in FIG. 3. Especially in an mmWave system, high frequency band characteristics may cause the sudden channel degradation so that the consecutive data transmission failures may happen within relatively short duration more severely. This consecutive transmission failures may result in a radio link failure which needs significant recovery time to attach to a new cell. The unreliable connection incurred from this characteristic may make system performance poor for ultra-reliable and low latency application services.

Figure 4:
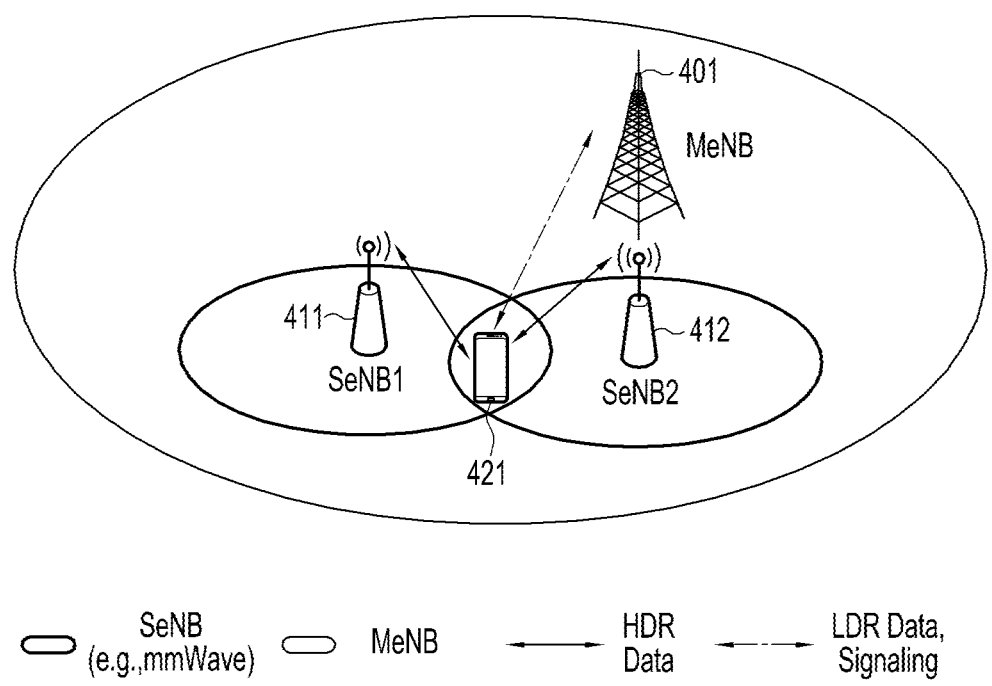
FIG. 4 illustrates an example of a hierarchical network to which an embodiment of the present disclosure is applied.

FIG. 4 illustrates an example of a hierarchical network to which an embodiment of the present disclosure is applied.

Referring to FIG. 4, in a hierarchical network structure, a UE 421 connect to a master eNB (MeNB) 401 and two secondary eNBs (SeNBs) 411 and 412. Control information is transmitted from the MeNB 401 to the UE 421, and high data rate traffic is accommodated by the SeNBs 411 and 412. While the MeNB 401 and the SeNBs 411 and 412 are illustrated as being separated in FIG. 4, the MeNB 401 and the SeNBs 411 and 412 may be eNBs performing the same operation depending on an embodiment. The MeNB 401 plays a role of an anchor to support reliable control data transmission. However, the present disclosure is also applicable to a standalone system, without being limited to a hierarchical network. A system to which the present disclosure is applied may be variable like either a co-located BS using multiple distinct frequency bands or a non-co-located BS but using the same frequency band. The MeNB 401 and the SeNBs 411 and 412 may operate in the same frequency band or different frequency bands. In an embodiment of the present disclosure, the MeNB 401 may be an LTE eNB operating in a 4G-cellular frequency band, and the SeNBs 411 and 412 may operate in an mmWave frequency band. Such a hierarchical network structure may be applied to existing LTE networks, standalone small-cell networks, heterogeneous networks, mmWave small-cell networks, and other similar networks.

A small-cell BS may operate at an LTE frequency, an mmWave frequency, or a frequency higher or lower than the LTE frequency. The small-cell BS may be a BS having cellular technology, Wireless Fidelity (Wi-Fi) technology, or Wireless Gigabit Alliance (WiGig) technology. The small-cell BS has the same capacity as a macro-cell BS, but may be configured to perform only some of normal base station functions such as an SeNB according to an embodiment of the present disclosure. As another example, the small-cell BS has a less capacity than the macro-cell BS; the small-cell BS is a transmission point, or the small-cell BS has layer 1 functions only, or the small-cell BS has layer 1 and MAC sub-layer functions only. The small-cell BS may have or may not have connection to a gateway (e.g., an S-GW). In the hierarchical network structure, the MeNB may be referred to as a central unit (CU), a radio controller, a central node (CN), etc., depending on a case, and the SeNB may be referred to as a distributed unit (DU), an access point (AP), a remote radio head (RRH), a transmission and reception point (TRP), etc., depending on a case.

Figure 5:
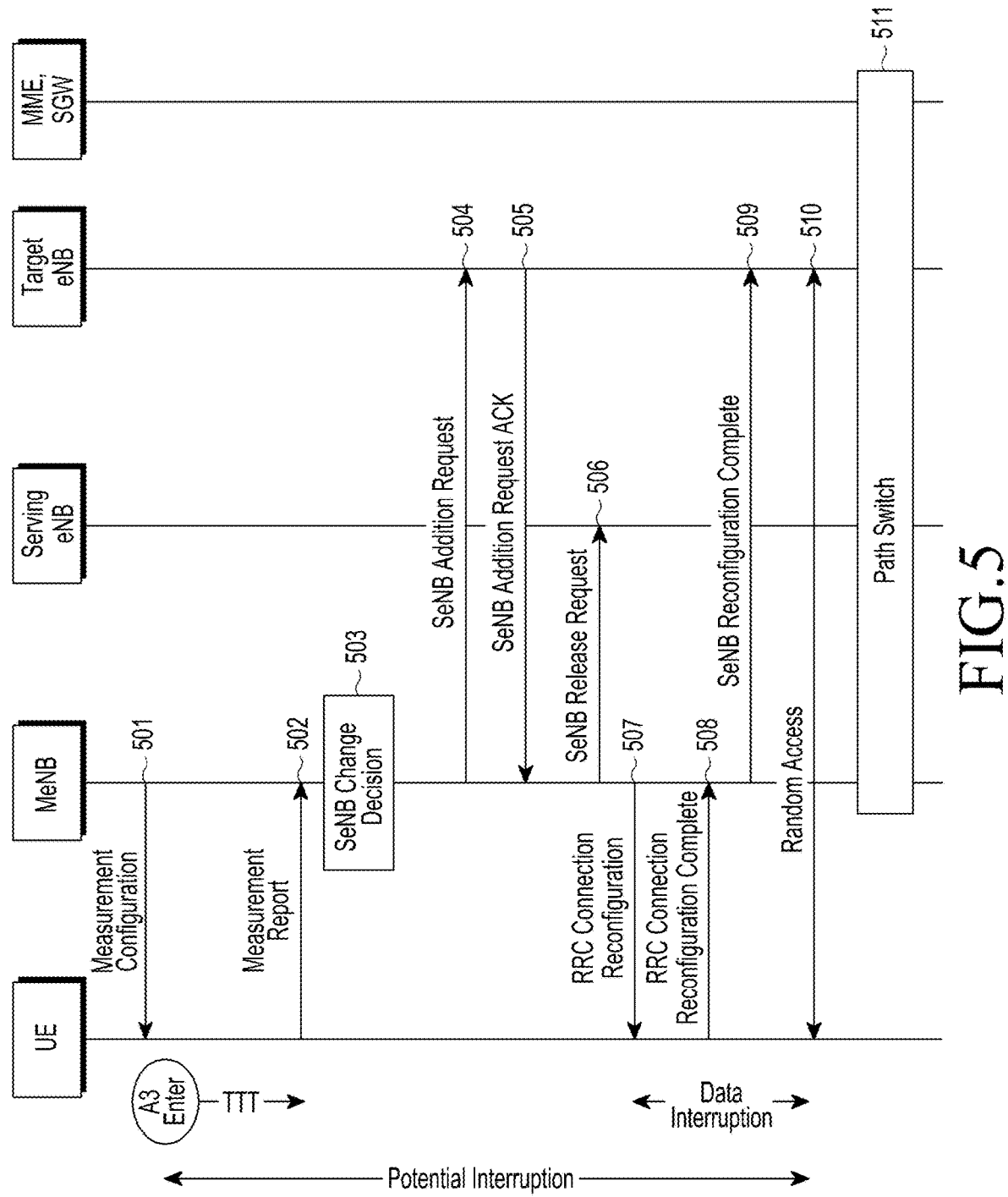
FIG. 5 illustrates an SeNB change process for dual connectivity in a general 3GPP system.

FIG. 5 illustrates an SeNB change process for dual connectivity in a general 3GPP system.

Referring to FIG. 5, as an MeNB that serves a UE transmits measurement configuration to a UE in operation 501, the UE transmits, in operation 502, a measurement report to the MeNB which then decides whether to change a serving SeNB based on the measurement report received from the UE in operation 503. For example, the MeNB may decide to change a serving SeNB if a received signal strength of the UE is less than a threshold value. The MeNB having decided to change the serving SeNB transmits an SeNB addition request to the target SeNB in operation 504, and transmits an SeNB addition request response to the MeNB in operation 505. The MeNB then transmits an SeNB release request to the serving SeNB in operation 506, transmits an RRC connection reconfiguration request to the UE in operation 507, and transmits an RRC connection reconfiguration complete message to the MeNB in operation 508. The MeNB transmits an SeNB reconfiguration complete message to the target SeNB in operation 509, and the target SeNB and the UE perform a random-access procedure in operation 510. An MME or SGW changes a data transmission path from the serving SeNB to the target SeNB in operation 511.

In a dual connectivity system, if the SeNB is an mmWave BS, data interruption in the handover of the SeNB may cause the more severe problem than in the existing standalone system. That is, since mmWave provides a very high data rate, data rate degradation caused by the data interruption may affect an application.

Figure 6:
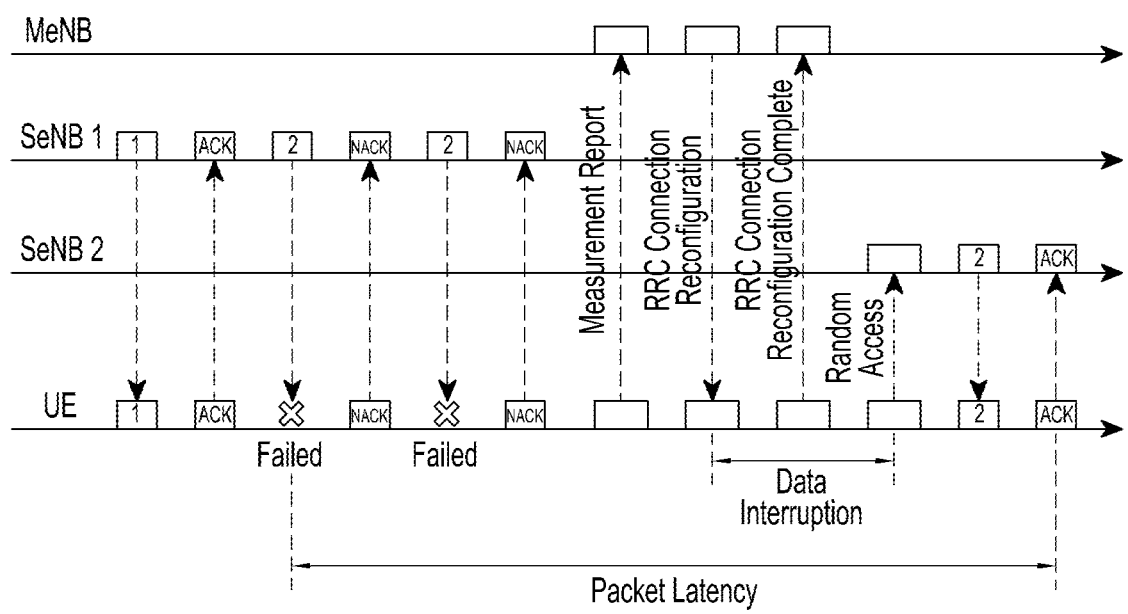
FIG. 6 illustrates data transmission and reception when an SeNB change occurs in a general hierarchical communication system.

FIG. 6 illustrates data transmission and reception when an SeNB change occurs in a general hierarchical communication system.

Referring to FIG. 6, a UE successfully receives the first data from a serving SeNB, SeNB1 and thus transmits an acknowledgement (ACK), and fails in receiving the second data and thus transmits a non-acknowledgement (NACK). The SeNB1 retransmits the second data, and the UE failing in receiving the retransmitted second data transmits a NACK. If experiencing such consecutive data reception failures, the UE transmits a measurement report to an MeNB to hand over to a new SeNB, and the MeNB performs an SeNB change procedure. As such, until setting up connection with the MeNB and the new SeNB, SeNB2, data interruption occurs. Moreover, substantially, the UE undergoes a latency for a long time from the failure in receiving the second data from the SeNB1 to a success in receiving the second data from the SeNB2.

Thus, an embodiment of the present disclosure proposes a method for effectively changing a transmission point to minimize a latency and data interruption.

Figure 7:
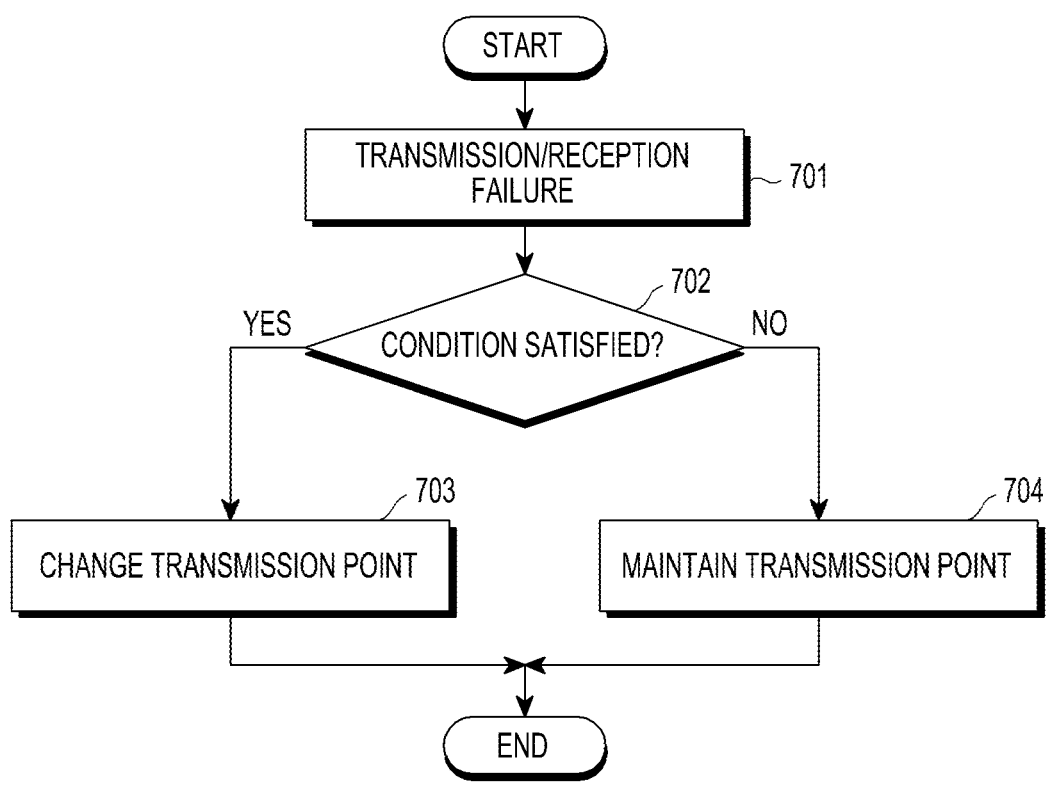
FIG. 7 is a flowchart of a procedure for changing a transmission point according to an embodiment of the present disclosure.

FIG. 7 is a flowchart of a procedure for changing a transmission point according to an embodiment of the present disclosure.

Referring to FIG. 7, a transmitter determines whether a data transmission/reception failure occurs during data transmission/reception with a receiver in operation 701. In an embodiment of the present disclosure, to determine whether the data transmission/reception failure occurs, an ACK, a NACK, a channel quality indicator (CQI), a modulation and coding scheme (MCS), a link quality, a reference signal received power (RSRP), a reference signal received quality (RSRQ), a received signal strength indication (RSSI), etc., may be used. A data reception failure for a downlink (DL) may be regarded as a failure in data packet decoding, physical downlink control channel (PDCCH) decoding, or physical downlink shared channel (PDSCH) decoding. A data reception failure for an uplink (UL) may be regarded as occurring if packet decoding fails, if power of a sounding reference signal (SRS) received by an eNB from a UE is lower than a predetermined threshold value, or if the eNB may not detect the ACK/NACK of the UE for the PDSCH. If these types of data transmission/reception failures occur consecutively a predetermined number of times, the transmitter determines whether a transmission point change condition is satisfied in operation 702.

If the transmission point change condition is satisfied, the transmitter changes a transmission point according to a preset rule and transmits and receives data through a new transmission point in operation 703; if the transmission point change condition is not satisfied, the transmitter maintains the current transmission point and transmits or receives data in operation 704. As such, to change the transmission point, a need exists for a precondition that there is at least one BS having the better channel than or an equivalent channel to a channel of a current camping BS. Such transmission point change may cause not only transmission point change for wireless communication, but also switch of a data path including a data path in a core network. The core network may be either wired or wireless. In order to support the transmission point change according to an embodiment of the present disclosure, either data forwarding or new data transmission from a gateway or from an MeNB may be needed. Moreover, data transmission/reception failure determination may be omitted, and a transmission point change condition may be directly measured. In this case, for the data transmission/reception failure determination, RSRP, RSRQ, RSSI, CQI information, etc., may be used.

The transmission point change condition according to an embodiment of the present disclosure may include service requirement related characteristics. For example, ultra-reliable and low-latency data needs fast data transmission without significant data interruption time, such that if the data transmission/reception failure happens, an algorithm for determining transmission point change according to an embodiment of the present disclosure may be triggered.

The algorithm for determining transmission point change according to an embodiment of the present disclosure may be executed in an MeNB of a hierarchical cellular system or a control agent or a UE of a multi-BS cellular system. The algorithm for determining transmission point change according to an embodiment of the present disclosure may also be executed in an eNB of a non-hierarchical cellular system.

Figure 8:
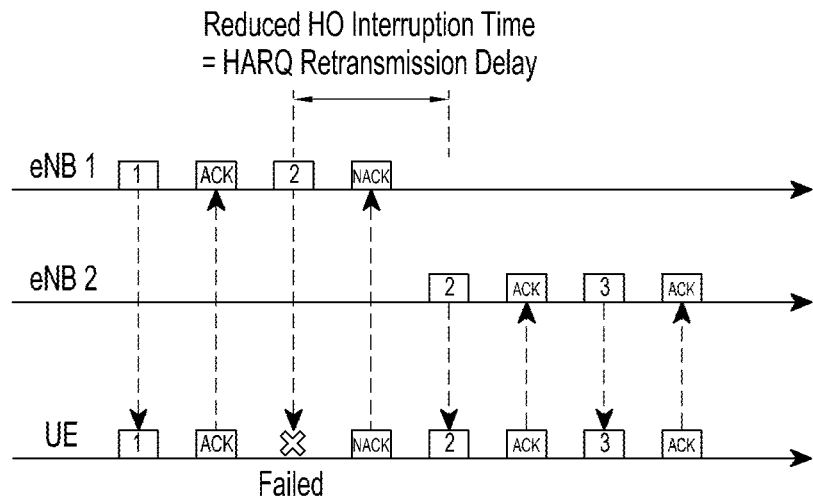
FIG. 8 illustrates a data transmission pattern according to an embodiment of the present disclosure.

FIG. 8 illustrates a data transmission pattern according to an embodiment of the present disclosure. In FIG. 8, an eNB1 and an eNB2 may be eNBs of a standalone network or MeNBs or SeNBs of a hierarchical network. In FIG. 8, if data transmission fails at a current transmission point, the transmission point is immediately changed.

Referring to FIG. 8, the current transmission point, the eNB1, transmits the first data transmission block to a UE which then transmits an ACK indicating successful reception to the eNB1. The eNB1 then transmits the second data transmission block to the UE. If the UE fails in receiving the second data transmission block, the UE transmits a NACK to the eNB1 which then determines that transmission point change is needed, and changes the transmission point to the eNB2. The eNB2 then transmits the second data transmission block, which fails to be transmitted by the eNB1, to the UE. As such, in FIG. 8, it is possible to reduce a handover interruption time (i.e., an HARQ retransmission delay) from transmission of the second data transmission block by the eNB1 to transmission of the second data transmission block by the eNB2.

Determination of the next transmission point may be made based on an ACK, a NACK, a CQI, an MCS, a link quality, an RSRP, an RSRQ, an RSSI, etc. Thus, data transmission may be switched through an HARQ process.

Figure 9:
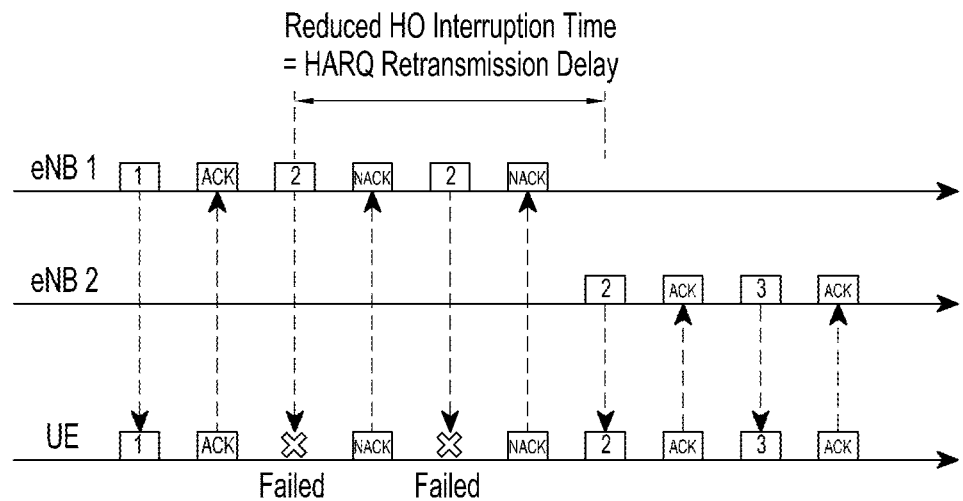
FIG. 9 illustrates a data transmission pattern according to another embodiment of the present disclosure.

FIG. 9 illustrates a data transmission pattern according to another embodiment of the present disclosure. In FIG. 9, an eNB1 and an eNB2 may be eNBs of a standalone network or MeNBs or SeNBs of a hierarchical network.

Referring to FIG. 9, the current transmission point, the eNB1, transmits the first data transmission block to a UE which then transmits an ACK indicating successful reception to the eNB1. The eNB1 then transmits the second data transmission block to the UE. If the UE fails in receiving the second data transmission block, the UE transmits a NACK to the eNB1 which then retransmits the second data transmission block. If the UE fails in receiving the second data transmission block, the UE transmits a NACK to the eNB1 which then determines that transmission point change is needed, and changes the transmission point to the eNB2. The eNB2 then transmits the second data transmission block, which fails to be transmitted by the eNB1, to the UE. As such, in FIG. 9, it is possible to reduce a handover interruption time (i.e., an HARQ retransmission delay) from first transmission of the second data transmission block by the eNB1 to transmission of the second data transmission block by the eNB2.

While the transmission point is immediately changed as soon as data transmission fails at the current transmission point twice consecutively in FIG. 9, the number of consecutive transmission failures for transmission point change may be set to a proper value based on system characteristics, an HARQ, a CQI, an MCS, etc. Even when a predetermined number of data transmission failures, instead of consecutive transmission failures, occur within a predetermined time, the transmission point may be changed. In this case, a predetermined time or a predetermined number of failures may be shared between an eNB and a UE.

Figure 10:
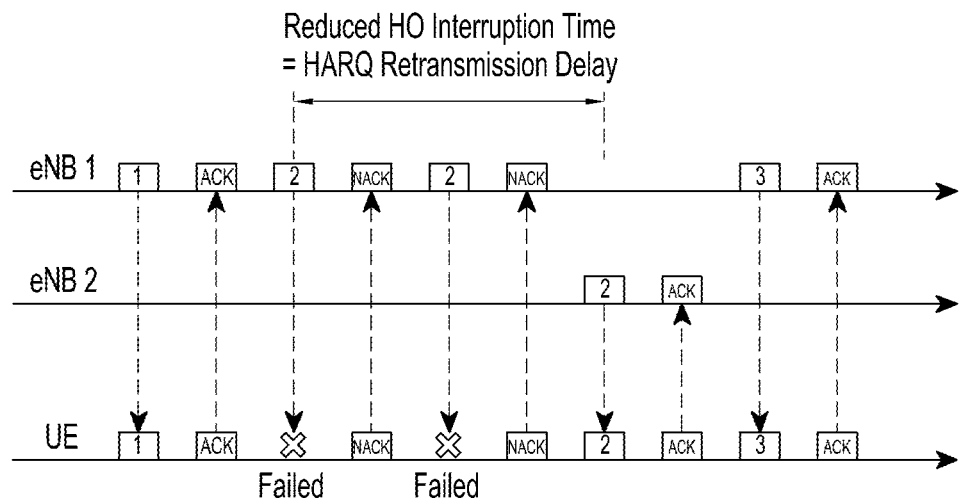
FIG. 10 illustrates a data transmission pattern according to another embodiment of the present disclosure.

FIG. 10 illustrates a data transmission pattern according to another embodiment of the present disclosure. In FIG. 10, an eNB1 and an eNB2 may be eNBs of a standalone network or MeNBs or SeNBs of a hierarchical network.

Referring to FIG. 10, if a predetermined number of transmission failures occur in the eNB1, the transmission point is changed to the eNB2 which then transmits a data transmission block failing to be transmitted to the UE, and the transmission point is returned to the original transmission point, the eNB1, if transmission of the data transmission block succeeds at the eNB2. A handover interruption time (i.e., an HARQ retransmission delay) in FIG. 10 is identical to that in FIG. 9. A transmission point change condition may be shared in advance between eNBs and between an eNB and a UE.

Figure 11:
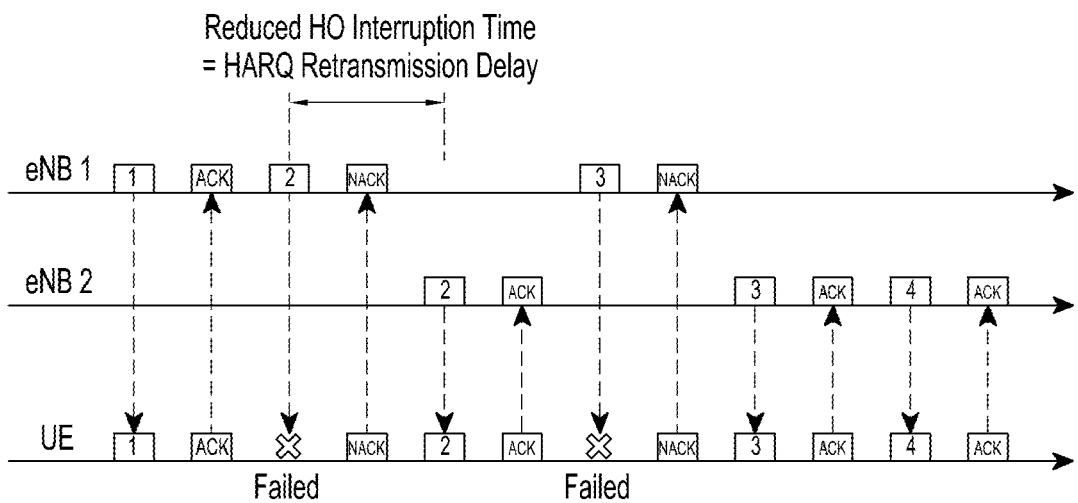
FIG. 11 illustrates a data transmission pattern according to another embodiment of the present disclosure.

FIG. 11 illustrates a data transmission pattern according to another embodiment of the present disclosure. In FIG. 10, an eNB1 and an eNB2 may be eNBs of a standalone network or MeNBs or SeNBs of a hierarchical network.

Referring to FIG. 11, if a transmission failure occurs in the eNB1, the transmission point is changed to the eNB2 which then transmits a data transmission block failing to be transmitted to the UE, and the transmission point is returned to the original transmission point, the eNB1, if transmission of the data transmission block succeeds at the eNB2. However, if another transmission failure occurs in the eNB1, the transmission point is changed to the eNB2 which has succeeded in transmitting the data transmission block before through the transmission point change. A handover interruption time (i.e., an HARQ retransmission delay) in FIG. 10 is identical to that in FIG. 8. A transmission point change condition may be shared in advance between eNBs and between an eNB and a UE.

Figure 12:
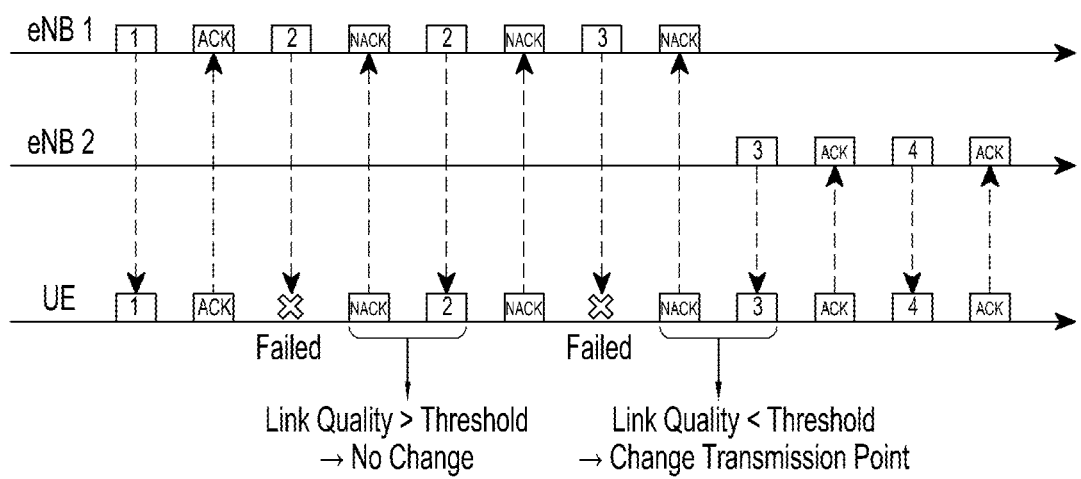
FIG. 12 illustrates a data transmission pattern according to another embodiment of the present disclosure.

FIG. 12 illustrates a data transmission pattern according to another embodiment of the present disclosure. In FIG. 12, an eNB1 and an eNB2 may be eNBs of a standalone network or MeNBs or SeNBs of a hierarchical network. In FIG. 12, transmission point change is performed based on a link quality as well as an HARQ ACK/NACK.

Referring to FIG. 12, if a data transmission failure occurs at the eNB1, the eNB1 checks its current link quality; if the link quality of the eNB1 is greater than or equal to a predetermined threshold value, the eNB1 continues transmission of a data transmission block without transmission point change, and if the link quality of the eNB1 is less than the predetermined threshold value, the transmission point is changed to the eNB2. The link quality may be an RSRP, an RSRQ, an RSSI, or a CQI. The transmission point change may be determined by a combination of some of the number of consecutive ACKs/NACKs, a CQI, an MCS, an RSRP, an RSRQ, and an RSSI. A transmission point change condition may be shared in advance between eNBs and between an eNB and a UE.

Examples illustrated in FIGS. 8 through 12 may be performed by a combination of two or more.

Figure 13A:
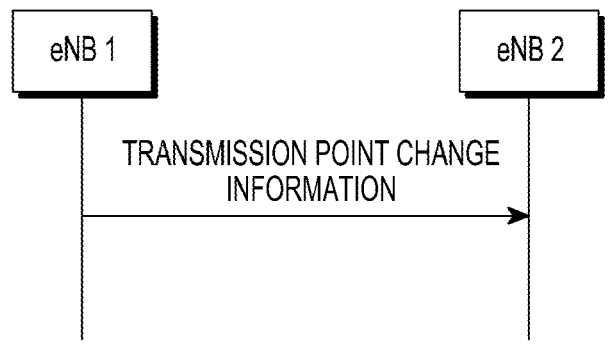
FIGS. 13A through 13C illustrate a process of transmitting transmission point change information according to an embodiment of the present disclosure.
Figure 13B:
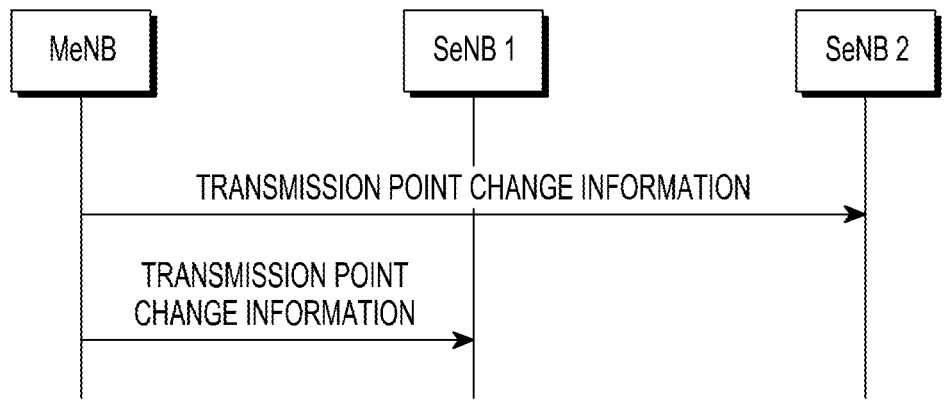
Figure 13C:
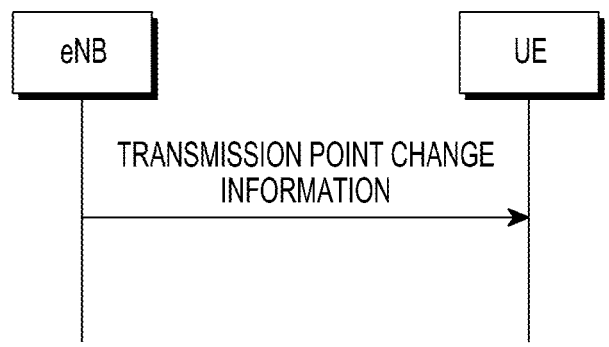

FIGS. 13A through 13C illustrate a process of transmitting transmission point change information according to an embodiment of the present disclosure.

To automatically select the next transmission point based on transmission point change information, rules of next transmission point selection need to be shared between eNBs or between entities related to packet transmission between the UE and one of eNBs. In FIG. 13A, a standalone network is assumed such that one eNB (eNB1) transmits transmission point change information to a transmission point change target eNB (eNB2). In FIG. 13B, a hierarchical network is assumed such that an MeNB transmits transmission point change information to an SeNB1 and an SeNB2. In FIG. 13C, an eNB transmits transmission point change information to a UE. The transmission point change information may include information indicating a scheme for selecting the next transmission point based on an ACK, an NACK, a CQI, an MCS, etc., as illustrated in FIGS. 9 through 12. In addition, other different rules may be applied in various ways. Rules for packet transmission and retransmission, e.g., stopped packet sequence information, stopped TB or RV information, scheduling information, etc., may also be provided to the target eNB (eNB2), together with the transmission point change information. The rules for packet transmission and retransmission may be previously stored in a session setup process, and if these rules are stored in advance, the transmission point change information may indicate activation or deactivation of transmission point selection, rather than the transmission point change condition.

The transmission point change information may also include information about the next transmission point. For example, if the transmission point change condition is satisfied during communication between the UE and the eNB1, information indicating change to the eNB2 may be included in the transmission point change information. The transmission point change information may also include information indicating an eNB to be used as a next transmission point after the eNB2. Such information may be an eNB ID, a physical cell ID, a transmission point (TP) ID, a TRP ID, a DU ID, etc.

The transmission point change information may also include frequency or bandwidth information. In this case, the transmission point change information may also include UE ID information to be used in a changed transmission point, and an eNB-specific C-RNTI, etc., may also be used as a UE ID. A random-access preamble for accessing an eNB may be allocated in advance, such that a random access may be previously performed to transmission point change target eNBs for synchronization, etc., before transmission point change occurs.

The transmission point change information may also include a security key, a UE context, eNB antenna information, and so forth.

The transmission point change information may also include a list of candidate eNBs to be used as a next transmission point. Also in this case, the transmission point change information may include an ID of a candidate eNB, a UE ID to be used by a candidate eNB, random access information, and so forth. When a UE selects an eNB from among several candidates, the UE may perform a random access to notify the selected eNB of movement of the UE to the selected eNB. The transmission point change information may further provide an eNB selection condition, together with the candidate eNB list. For example, a signal strength and an expected transmission speed of an eNB, etc., may be provided. Alternatively, an eNB-specific priority may be provided.

The transmission point change condition may include conditions described below. The following conditions may be used alone or in combination of two or more. The transmission point change condition may include only indications of the following conditions.

if a predetermined number of consecutive HARQ failures are observed;
if a predetermined number of HARQ failures within a predetermined time are observed;
if a rate of HARQ failures is greater than or equal to a predetermined value;
if a predetermined number of consecutive ARQ NACKs are observed;
if a predetermined number of consecutive ARQ NACKs within a predetermined time are observed;
if a rate of ARQ failures is greater than or equal to a predetermined value; and
if a frequency of an ARQ feedback (state report) is higher than or equal to a predetermined level.

Figure 14:
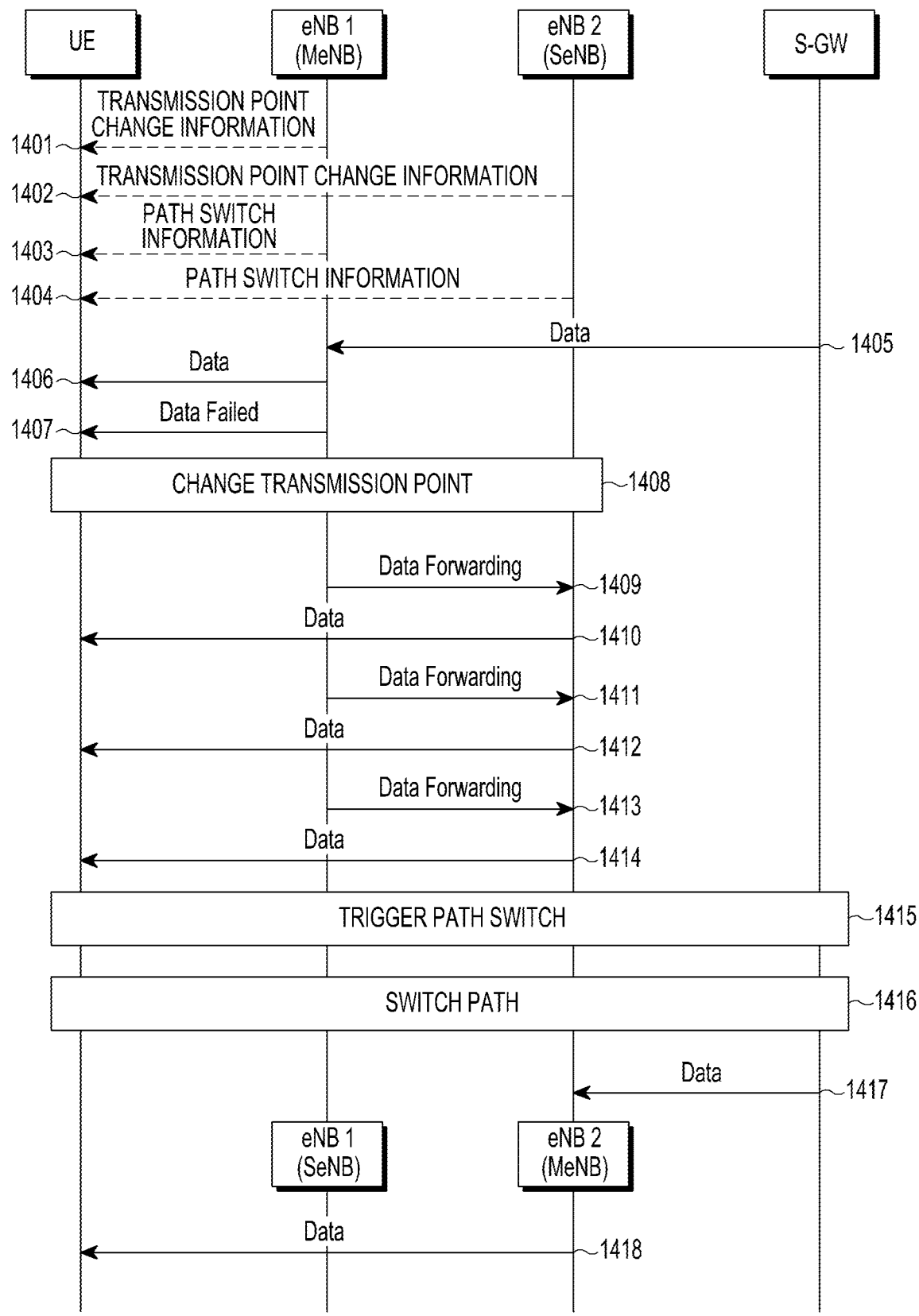
FIG. 14 illustrates transmission point change and path switch according to an embodiment of the present disclosure.

FIG. 14 illustrates transmission point change and path switch according to an embodiment of the present disclosure.

In FIG. 14, a UE is assumed to connect to two eNBs, an eNB1 and an eNB2. One of the eNBs may be an MeNB, and the other eNB may be an SeNB. The MeNB may be replaced with a serving eNB, and the SeNB may be replaced with a target eNB. After path switch, data is delivered from a network entity like an S-gateway to the eNB2.

Although FIG. 14 illustrates a case for DL data traffic for convenience, an embodiment of the present disclosure is also applicable to UL traffic. DL data packets are transmitted from a core network to the UE through the MeNB. The SeNB transmits at least one DL packets to the UE. In this case, the MeNB notifies occurrence of the transmission by the SeNB to the SeNB or forwards the DL packets to the SeNB to transmit the same to UE. The data packet may be a PHY PDU, a MAC PDU, an RLC PDU, a PDCP PDU or an RRC PDU. If the data packet is an MAC PDU, HARQ may be applied thereto.

In FIG. 14, it is assumed that initially, the eNB1 is an MeNB and the eNB2 is an SeNB. The UE receives transmission point change information from the MeNB, the eNB1, in operation 1401. Depending on a case, the UE receives the transmission point change information from the SeNB, the eNB2, in operation 1402. The UE receives path switch information in operations 1403 and 1404.

The eNB1 receives a data packet from an S-GW in operation 1405 and transmits the same to the UE in operation 1406. If a first data packet is successfully transmitted to the UE from the eNB1 in operation 1406, but a second data packet fails to be transmitted to the UE from the eNB1 in operation 1407, then a transmission point is changed based on the previously received transmission point change information in operation 1408, and then the second data packet is retransmitted from the eNB2. That is, the eNB1 forwards the second data packet to the eNB2 for retransmission of the second data packet in operation 1409, and the eNB2 transmits the forwarded second data packet to the UE in operation 1410. Transmission of third and fourth data packets are performed by the eNB2 based on the transmission point change information in operations 1412 and 1414, and the third data packet and the fourth data packet are forwarded from the eNB1 to the eNB2 for transmission in operations 1411 and 1413. Depending on a case, data may be transmitted from the SGW to the eNB2 in advance, and in this case, the eNB1 may transmit only an indication of transmission of particular data to the UE, instead of forwarding the data to the eNB2.

If data packet transmission succeeds a predetermined number of times in the changed transmission point, the eNB2, at least one of the UE and the eNBs triggers path switch based on previously stored path switch information and switches a path in operations 1415 and 1416. In FIG. 14, a path switch condition is three consecutive data transmission successes. The triggering occurs between the eNB1 and the eNB2. If the path is switched, the eNB1 is the SeNB and the eNB2 is the MeNB. Thus, the S-GW transmits the data packet to the eNB2 in operation 1417, and the eNB2 transmits the data to the UE in operation 1418.

Figure 15:
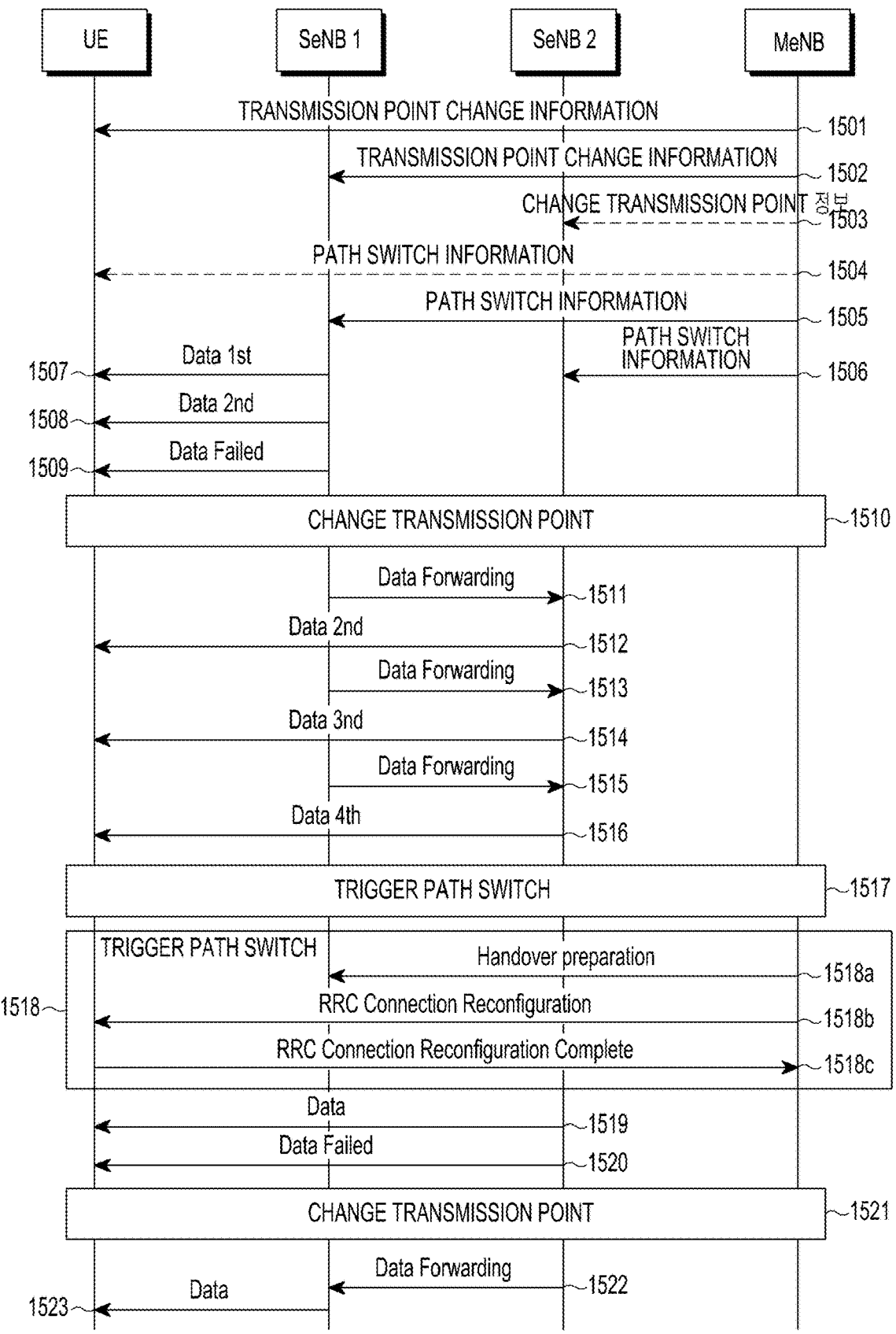
FIG. 15 illustrates transmission point change and path switch according to another embodiment of the present disclosure.

FIG. 15 illustrates transmission point change and path switch according to another embodiment of the present disclosure. In FIG. 15, the UE is assumed to connect to three eNBs. One of the eNBs may be an MeNB, and the other eNBs may be SeNBs. An operating frequency of the MeNB may be different from those of the SeNBs. For example, the MeNB may be an LTE eNB operating at a frequency lower than 6 GHz, and the SeNBs may be LTE eNBs operating at a frequency higher than or equal to 10 GHz. In this network, data transmission for a service needing a very high data rate may occur only by an SeNB supporting a higher data rate having a wide frequency spectrum in a higher frequency band. Although FIG. 15 illustrates a case for DL data traffic for convenience, an embodiment of the present disclosure is also applicable to UL traffic.

In FIG. 15, it is assumed that an SeNB1 transmits data initially. Thus, the SeNB1 may be referred to as a serving SeNB and an SeNB2 may be referred to as a target SeNB. The MeNB transmits transmission point change information to the SeNB1 and the UE in operations 1501 and 1502. The MeNB transmits path switch information to the SeNB1 and the SeNB2 in operations 1505 and 1506. Depending on a case, the MeNB transmits the transmission point change information to the SeNB in operation 1503, and transmits the path switch information to the UE in operation 1504. Also, depending on a case, the SeNB1 may transmit the transmission point change information and the path switch information to the UE and the SeNB2.

The SeNB1 transmits a first data packet to the UE in operation 1507, and transmits a second data packet to the UE in operation 1508. If the first data packet is successfully transmitted to the UE, but the second data packet fails to be transmitted to the UE in operation 1509, then a transmission point is changed based on the previously received transmission point change information in operation 1510, and then the second data packet is retransmitted from the eNB2. That is, the SeNB1 forwards the second data packet to the eNB2 for retransmission of the second data packet in operation 1511, and the SeNB2 transmits the forwarded second data packet to the UE in operation 1512. Transmission of third and fourth data packets are also performed by the SeNB2 based on the transmission point change information in operations 1514 and 1516, and the third data packet and the fourth data packet are forwarded from the SeNB1 to the SeNB2 for transmission in operations 1513 and 1515. Depending on a case, data may be transmitted to the SeNB2 in advance, and in this case, the SeNB1 may transmit only an indication of transmission of particular data to the UE, instead of forwarding the data to the SeNB2.

If data packet transmission succeeds a predetermined number of times in the changed transmission point, the SeNB2, at least one of the UE and the eNBs triggers path switch based on previously stored path switch information and switches a path in operations 1517 and 1518. In FIG. 15, three consecutive data transmission successes are set as the path switch condition, and if data transmission succeeds three times consecutively, then path switch is triggered, which means that the eNB (SeNB2) receives data destined to the UE by directly connecting to a core network. The connection may be physical or logical. The triggering occurs among the MeNB, the SeNB1, and the SeNB2. According to an embodiment, the UE may have to recognize path switch. In a path switch process, the eNBs and the core network may perform a handover preparation operation of exchanging messages related to a UE context managed by the MeNB and the SeNBs. That is, the MeNB transmits a handover preparation message to the SeNB1 in operation 1518a, and transmits an RRC connection reconfiguration message to the UE to update SeNB information in operation 1518b. The RRC connection reconfiguration message may be transmitted to the UE by another eNB. The RRC connection reconfiguration message may also include a C-RNTI and a measurement configuration to be used by a new SeNB. If the UE does not need to update any information about the eNBs, the RRC connection reconfiguration message may be omitted. After completing information update in the UE, the UE may transmit an RRC connection reconfiguration complete message to one of the eNBs. In FIG. 15, the UE transmits the RRC connection reconfiguration complete message to the MeNB in operation 1518c. If the UE does not need to update any information about the eNBs, the RRC connection reconfiguration complete message may be omitted.

After completion of path switch, a data path is switched to "via the SeNB2", and the SeNB2 may be referred to as a serving SeNB. The SeNB transmits a data packet to the UE in operation n1520. When there are only two transmission point change candidate eNBs are the SeNB1 and the SeNB2, and the same transmission point change condition is applied to the two SeNBs, if data transmission from the SeNB2 fails in operation 1520, the transmission point is changed back to the SeNB1 in operation 1521. The data is then forwarded from the SeNB2 to the SeNB1 in operation 1522, and is transmitted from the SeNB1 to the UE in operation 1523.

Figure 16:
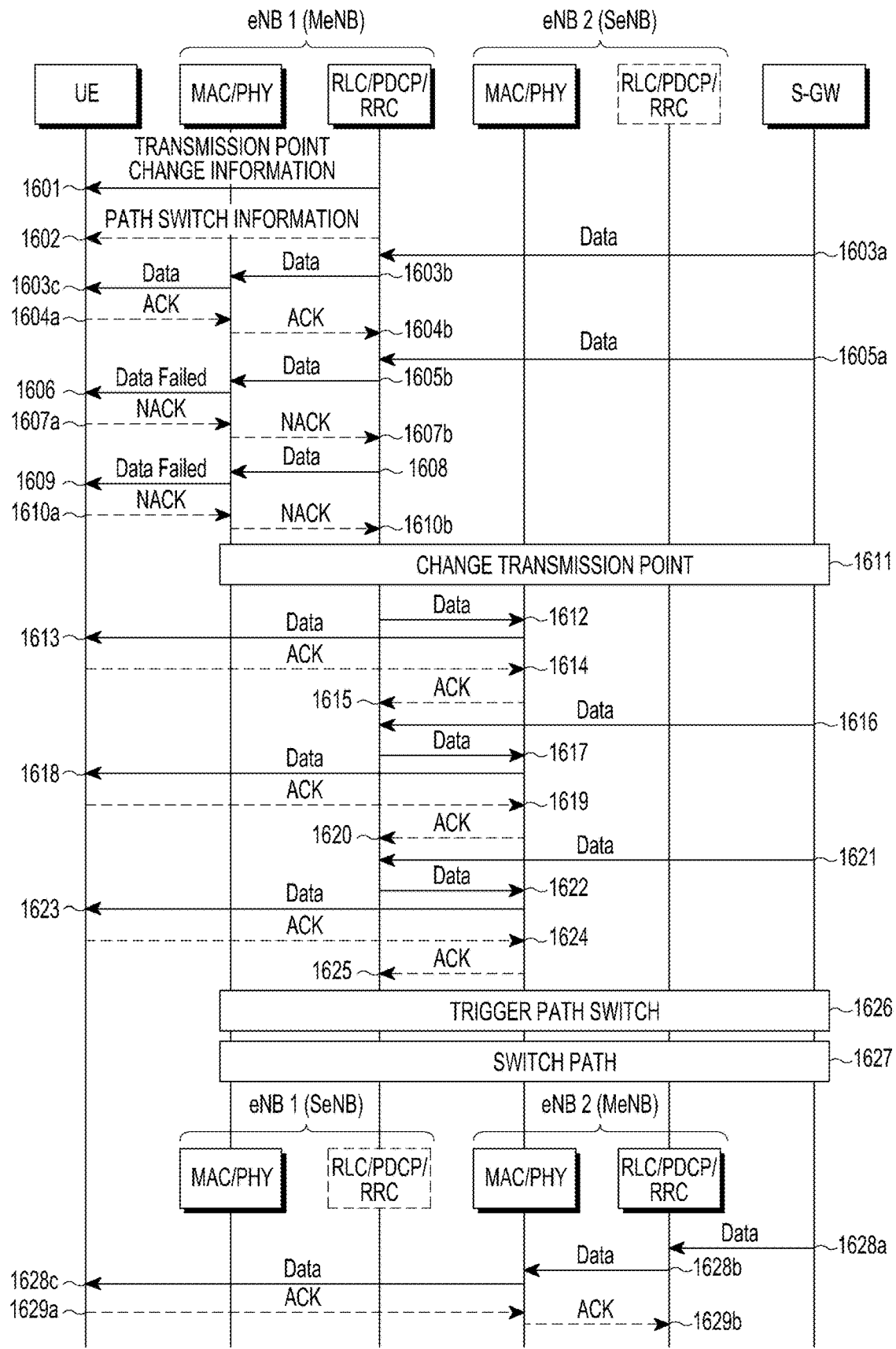
FIG. 16 illustrates transmission point change and path switch according to another embodiment of the present disclosure.

FIG. 16 illustrates transmission point change and path switch according to another embodiment of the present disclosure. In FIG. 16, a 3GPP hierarchical structure where eNBs include PHY/MAC/RLC/PDCP layers is assumed, and in particular, only an MeNB has the RLC layer and the SeNB only supports the PHY/MAC layers for multiple-eNB connection. Thus, data retransmission may be performed only by the MeNB that controls the RLC layer for the UE.

RLC ACK/NACK may be transmitted in an explicit or implicit manner. In addition, reception information for a plurality of RLC data packets may be indicated using block ACK/NACK. While DL transmission is assumed in FIG. 16, application to an UL case may also be possible. An embodiment of FIG. 16 is also applicable to an HARQ process operating on the MAC layer, and in this case, ACK/NACK information may be an HARQ ACK/NACK corresponding to an HARQ process and the MeNB may perform transmission point change based on HARQ ACK/NACK information.

In FIG. 16, it is assumed that an eNB1 transmits data initially. Thus, the eNB1 may be referred to as an MeNB and the eNB2 may be referred to as an SeNB. The eNB1 transmits transmission point change information to the UE in operation 1601. Depending on a case, the eNB1 transmits path switch information to the UE in operation 1602. The eNB1 receives a first data packet from an S-GW in operation 1603a and transmits the same to the UE in operations 1603b and 1603c. The UE transmits an ACK for the successfully received first data packet to the eNB1 in operation 1604a, and MAC/PHY layers of the eNB1 deliver the received ACK to the RLC/PDCP/RRC layers in operation 1604b. The RLC/PDCP/RRC layers of the eNB1 receive a second data packet from the S-GW in operation 1605a and delivers the second data packet to the MAC/PHY layers in operation 1605b, and the MAC/PHY layers then deliver the second data packet to the UE. If the second data packet fails to be transmitted in operation 1606, the UE transmits a NACK to the MAC/PHY layers of the eNB1 in operation 1607a, and the MAC/PHY layers of the eNB1 deliver the received NACK to the RLC/PDCP/RRC layers in operation 1607b. The RLC/PDCP/RRC layers retransmit the second data packet failing to be transmitted to the MAC/PHY layers in operation 1608, and the MAC/PHY layers transmit the second data packet to the UE. If the second data packet fails to be transmitted in operation 1609, the UE transmits a NACK to the MAC/PHY layers of the eNB1 in operation 1610a, and the MAC/PHY layers of the eNB1 deliver the received NACK to the RLC/PDCP/RRC layers in operation 1610b. In FIG. 16, it is assumed that transmission point change occurs in case of two consecutive data packet transmission failures. Thus, transmission point change is performed among the eNB1, the eNB2, and the S-GW in operation 1611, and the eNB1 transmits the second data packet failing to be transmitted to the eNB2 for retransmission of the second data packet in operation 1612. The eNB2 transmits the second data packet to the UE in operation 1613. If successfully receiving the second data packet, the UE transmits an ACK to the eNB2 in operation 1614. Depending on a case, the eNB2 forwards the ACK received from the UE to the eNB1 in operation 1615.

The eNB1 then transmits third and fourth data packets received from the S-GW to the eNB2 which then transmits the third and fourth data packets to the UE, and the UE transmits ACKs for the third and fourth data packets to the eNB2, and depending on a case, the eNB2 forwards the ACK to the eNB1 in operations 1616 through 1625.

In FIG. 16, it is assumed that the path is switched if data packet transmission at the changed transmission point succeeds three times consecutively. Thus, the eNB2 triggers path switch in operation 1626 after receiving the ACK for the fourth data packet, and path switch is performed among the eNB1, the eNB2, and the S-GW in operation 1627. After the path switch, the eNB2 becomes a new MeNB that controls an RLC layer. Thus, the RLC/PDCP/RRC layers of the eNB2 receive a new data packet for the UE from the S-GW in operation 1628a and delivers the new data packet to the MAC/PHY layers in operation 1628b, and the MAC/PHY layers then deliver the new data packet to the UE in operation 1628c. The UE transmits an ACK to the eNB2 in operation 1629a if successfully receiving a data packet, and the MAC/PHY layers of the eNB2 deliver an ACK received from the UE to the RLC/PDCP/RRC layers in operation 1629b. A transmission point change condition and a path switch triggering condition may change in various ways depending on service and system requirements. If eNBs have agreed to transmit an ACK or a NACK only in a particular condition, forwarding of the ACK or the NACK from the eNB2 to the eNB1 after transmission point change may be omitted. If a corresponding condition is satisfied, an ACK or a NACK for data packets may be transmitted at a time.

Figure 17:
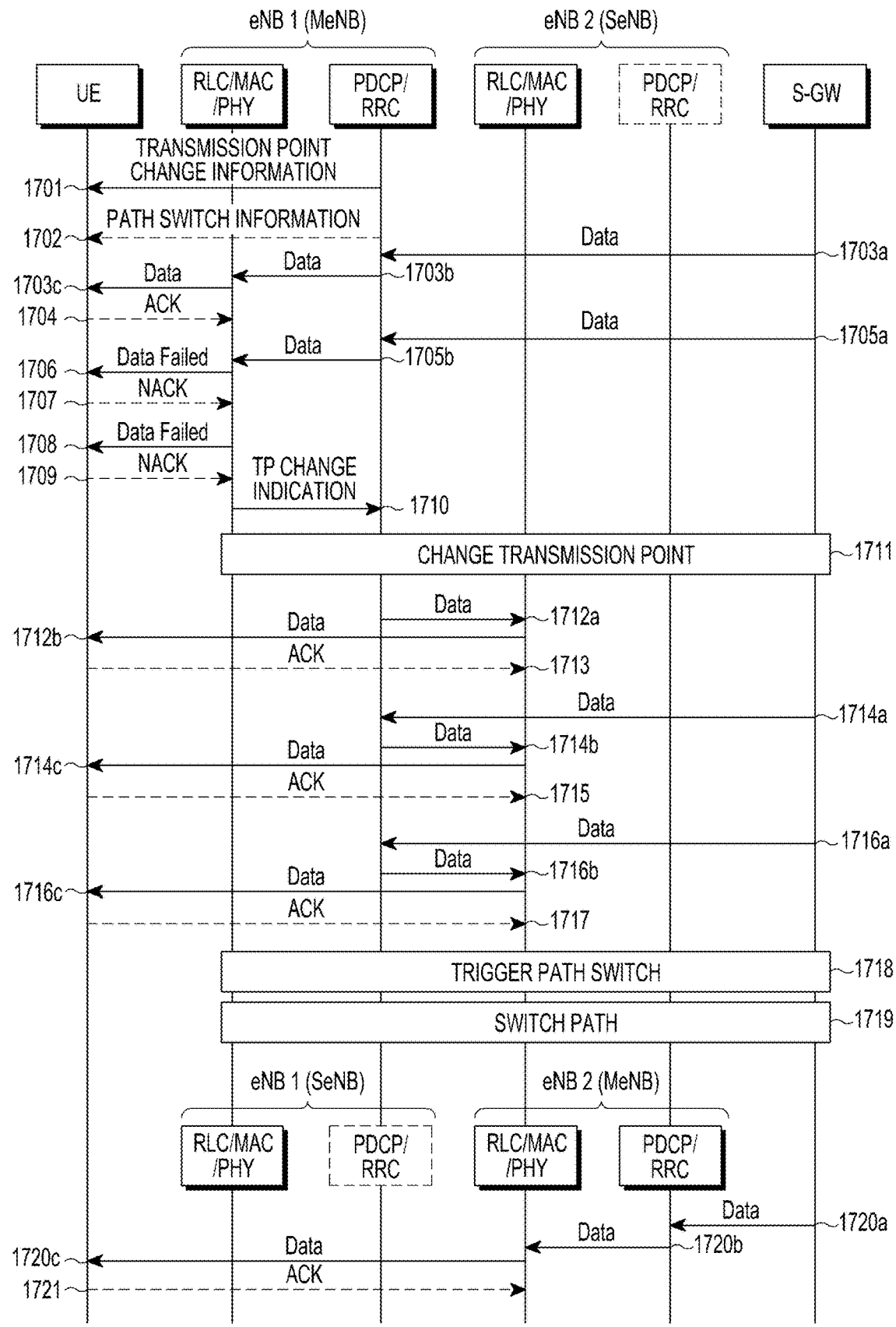
FIG. 17 illustrates transmission point change and path switch according to another embodiment of the present disclosure.

FIG. 17 illustrates transmission point change and path switch according to another embodiment of the present disclosure. In FIG. 17, a 3GPP hierarchical structure where eNBs include PHY/MAC/RLC/PDCP layers is assumed, and in particular, only an MeNB has the PDCP layer and the SeNB only supports the RLC/MAC/PHY layers for multiple-eNB connection. Thus, data retransmission may be performed by one of eNBs to which a UE connects. RLC ACK/NACK or HARQ ACK/NACK may be transmitted in an explicit or implicit manner. In addition, reception information for a plurality of RLC or MAC data packets may be indicated using block ACK/NACK. While DL transmission is assumed in FIG. 17, application to an UL case may also be possible.

In FIG. 17, it is assumed that an eNB1 transmits data initially. Thus, the eNB1 may be referred to as an MeNB and the eNB2 may be referred to as an SeNB. The eNB1 transmits transmission point change information to the UE in operation 1701. Depending on a case, the eNB1 transmits path switch information to the UE in operation 1702. The eNB1 receives a first data packet from an SGW in operation 1703a and transmits the same to the UE in operations 1703b and 1703c. The UE transmits an ACK for the successfully received first data packet to the eNB1 in operation 1704. The RLC/PDCP/RRC layers of the eNB1 receive a second data packet from the S-GW in operation 1705a and delivers the second data packet to the RLC/MAC/PHY layers in operation 1705b, and the RLC/MAC/PHY layers then deliver the second data packet to the UE. If failing to transmit the second data packet in operation 1706, the UE transmits a NACK to the eNB1 in operation 1707, and the RLC/MAC/PHY layers of the eNB1 retransmit the second data packet to the UE. If failing to retransmit the second data packet in operation 1708, the UE transmits a NACK to the eNB1 in operation 1709.

In FIG. 17, it is assumed that transmission point change occurs in case of two consecutive data packet transmission failures. Thus, the eNB1 having failed in data packet transmission twice consecutively transmits a TP change indication to the PDCP/RRC layers of the eNB1 to enable retransmission of the data packet by another eNB (i.e., the eNB2) in operation 1710. If transmission point change may be performed in a layer of the eNB1 other than the PDCP/RRC layers, the eNB1 may transmit the TP change indication to the layer. Thus, transmission point change is performed among the eNB1, the eNB2, and the S-GW in operation 1711, and the eNB1 transmits the second data packet failing to be transmitted to the eNB2 for retransmission of the second data packet in operation 1712a. The eNB2 retransmits the second data packet to the UE in operation 1712b. The retransmitted packet may be a MAC packet, an RLC packet, or a PDCP packet. If successfully receiving the second data packet, the UE transmits an ACK to the eNB2 in operation 1713.

The eNB1 then transmits third and fourth data packets received from the S-GW to the eNB2 which then transmits the third and fourth data packets to the UE, and the UE transmits ACKs for the third and fourth data packets to the eNB2, and depending on a case, the eNB2 forwards the ACK to the eNB1 in operations 1714a through 1717.

In FIG. 17, it is assumed that the path is switched if data packet transmission at the changed transmission point succeeds three times consecutively. Thus, the eNB2 triggers path switch in operation 1718 after receiving the ACK for the fourth data packet, and path switch is performed among the eNB1, the eNB2, and the S-GW in operation 1719. After the path switch, the eNB2 becomes a new MeNB that controls a PDCP layer. Thus, the PDCP/RRC layers of the eNB2 receive a new data packet for the UE from the S-GW in operation 1720a and delivers the new data packet to the RLC/MAC/PHY layers in operation 1720b, and the RLC/MAC/PHY layers then deliver the new data packet to the UE in operation 1720c. If successfully receiving the new data packet, the UE transmits an ACK to the eNB2 in operation 1721. A transmission point change condition and a path switch triggering condition may change in various ways depending on service and system requirements.

Figure 18:
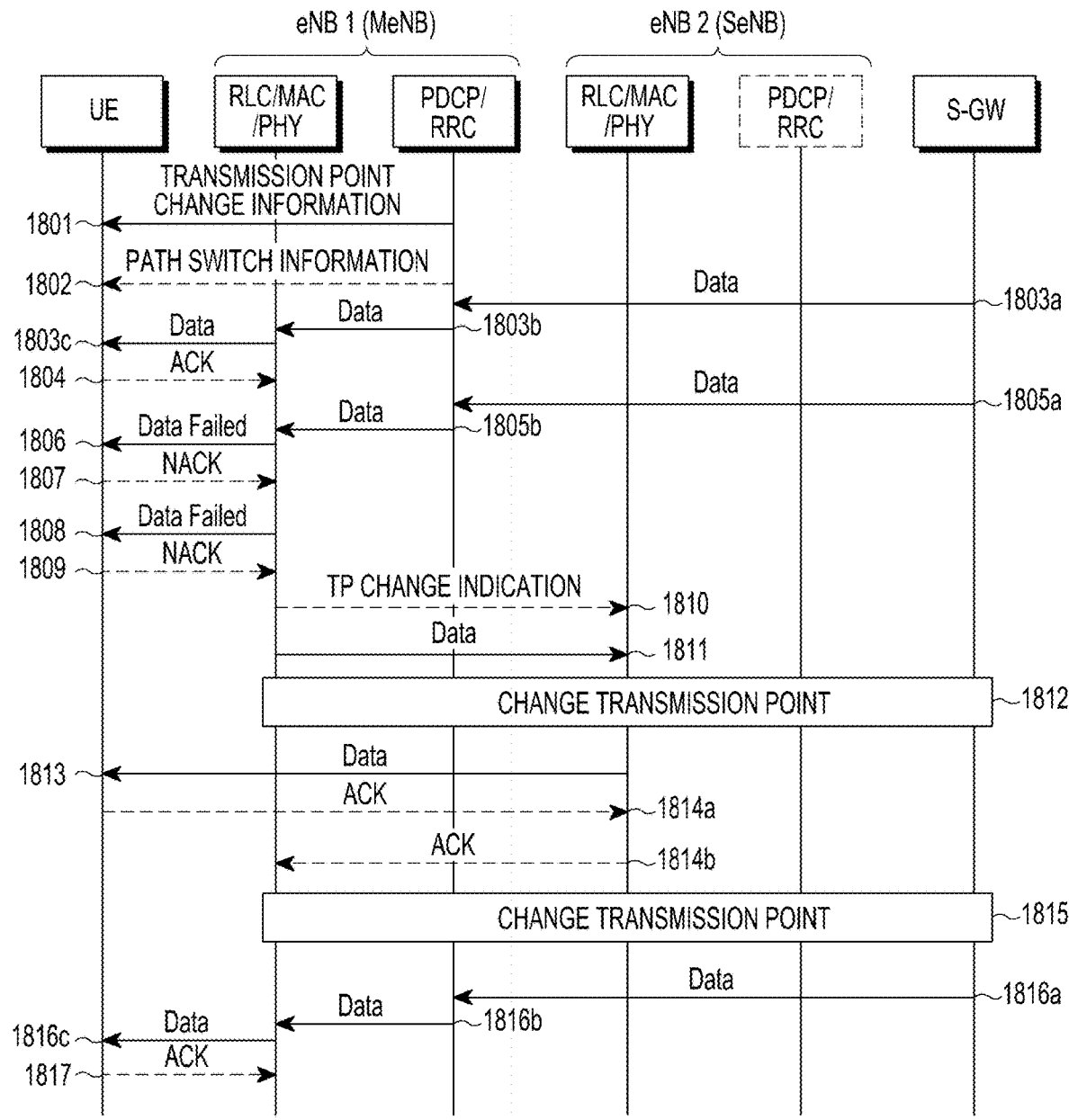
FIG. 18 illustrates transmission point change and path switch according to another embodiment of the present disclosure.

FIG. 18 illustrates transmission point change and path switch according to another embodiment of the present disclosure. In FIG. 18, a 3GPP hierarchical structure where eNBs include PHY/MAC/RLC/PDCP layers is assumed, and in particular, only an MeNB has the PDCP layer and the SeNB only supports the RLC/MAC/PHY layers for multiple-eNB connection. Thus, data retransmission may be performed by one of eNBs to which a UE connects. RLC ACK/NACK or HARQ ACK/NACK may be transmitted in an explicit or implicit manner. In addition, reception information for a plurality of RLC or MAC data packets may be indicated using block ACK/NACK. While DL transmission is assumed in FIG. 18, application to an UL case may also be possible.

In FIG. 18, it is assumed that an eNB1 transmits data initially. Thus, the eNB1 may be referred to as an MeNB and the eNB2 may be referred to as an SeNB. The eNB1 transmits transmission point change information to the UE in operation 1801. Depending on a case, the eNB1 transmits path switch information to the UE in operation 1802. The eNB1 receives a first data packet from an S-GW in operation 1803a and transmits the same to the UE in operations 1803b and 1803c. The UE transmits an ACK for the successfully received first data packet to the eNB1 in operation 1804. The RLC/PDCP/RRC layers of the eNB1 receive a second data packet from the S-GW in operation 1805a and delivers the second data packet to the RLC/MAC/PHY layers in operation 1805b, and the RLC/MAC/PHY layers then deliver the second data packet to the UE. If failing to transmit the second data packet in operation 1806, the UE transmits a NACK to the eNB1 in operation 1807, and the RLC/MAC/PHY layers of the eNB1 retransmit the second data packet to the UE. If failing to retransmit the second data packet in operation 1808, the UE transmits a NACK to the eNB1 in operation 1809.

In FIG. 18, it is assumed that transmission point change occurs in case of two consecutive RLC or MAC data packet transmission failures. Thus, the RLC/MAC/PHY layers of the eNB1 having failed in RLC or MAC data packet transmission twice consecutively transmits a TP change indication to the PDCP/RRC layers of the eNB1 to enable retransmission of the RLC or MAC data packet by another eNB (i.e., the eNB2) in operation 1810. The eNB1 transmits the second data packet failing to be transmitted to the eNB2 for retransmission of the second data packet in operation 1811. Thereafter, transmission point change is performed among the eNB1, the eNB2, and the S-GW in operation 1812, and the eNB2 transmits the second data packet to the UE in operation 1813. The retransmitted packet may be a MAC packet, an RLC packet, or a PDCP packet. If successfully receiving the second data packet, the UE transmits an ACK to the eNB2 in operation 1814a, and the eNB2 transmits the ACK received from the UE to the eNB1. The eNB1 then determines that the second data packet is successfully transmitted, and performs transmission point change to the eNB1 in operation 1815. Thus, thereafter, the eNB1 receives a third data packet from the S-GW in operation 1816a and transmits the same to the UE in operations 1816b and 1816c. The UE transmits an ACK for the successfully received third data packet to the eNB1 in operation 1817.

Figure 19:
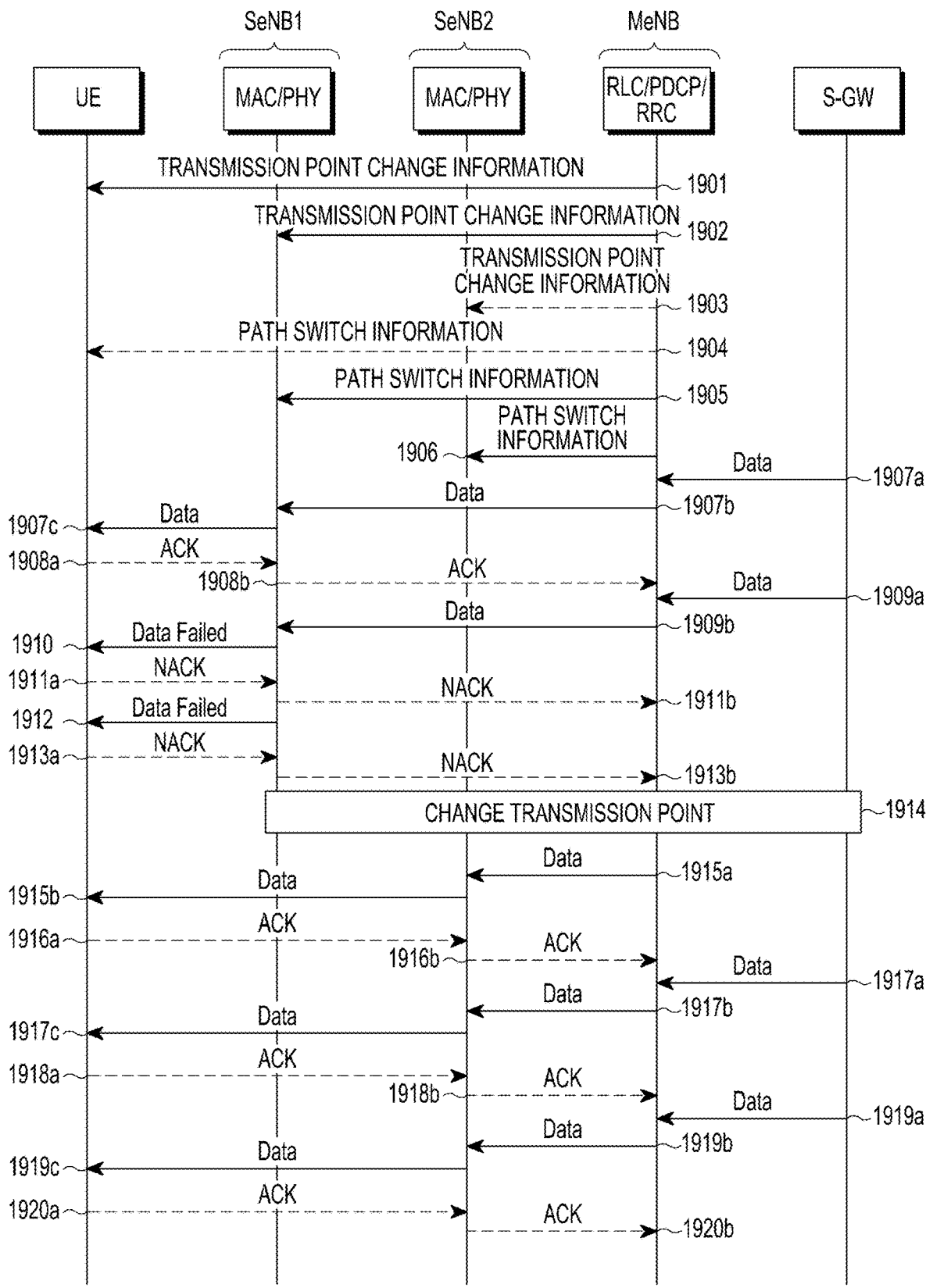
FIG. 19 illustrates transmission point change and path switch according to another embodiment of the present disclosure.

FIG. 19 illustrates transmission point change and path switch according to another embodiment of the present disclosure. In FIG. 19, the UE is assumed to connect to three eNBs. One of the eNBs may be an MeNB, and the other eNBs may be SeNBs. An operating frequency of the MeNB may be different from those of the SeNBs. For example, the MeNB may be an LTE eNB operating at a frequency lower than 6 GHz, and the SeNBs may be LTE eNBs operating at a frequency higher than or equal to 10 GHz. In this network, data transmission for a service needing a very high data rate may occur only by an SeNB supporting a higher data rate having a wide frequency spectrum in a higher frequency band. In particular, depending on an embodiment of the present disclosure, the MeNB may not have a physical layer that actually manages data transmission. In FIG. 19, a 3GPP hierarchical structure where eNBs include PHY/MAC/RLC/PDCP layers is assumed, and in particular, only an MeNB has the RLC layer and the SeNB only supports the PHY/MAC layers for multiple-eNB connection. Thus, data retransmission based on ARQ may be performed only by the MeNB that controls the RLC layer for the UE. Retransmission based on HARQ may be performed only by the SeNB that controls the MAC layer, but for path switch, the entire HARQ ACK/NACK information of the MAC layer, a part thereof, or a modified form thereof may be transmitted to the MeNB. RLC ACK/NACK may be transmitted in an explicit or implicit manner. In addition, reception information for a plurality of data packets may be indicated using block ACK/NACK. Although FIG. 19 illustrates a case for DL data traffic for convenience, an embodiment of the present disclosure is also applicable to UL traffic.

In FIG. 19, it is assumed that an SeNB1 transmits data initially. The MeNB transmits transmission point change information to the SeNB1 and the UE in operations 1901 and 1902. The MeNB transmits path switch information to the SeNB1 and the SeNB2 in operations 1905 and 1906. Depending on a case, the MeNB transmits the transmission point change information to the SeNB in operation 1903, and transmits the path switch information to the UE in operation 1904. Also, depending on a case, the SeNB1 may transmit the transmission point change information and the path switch information to the UE and the SeNB2.

The MeNB receives a first data packet from an S-GW in operation 1907a and transmits the same to the UE through the SeNB1 in operations 1907b and 1907c. The UE transmits an ACK for the successfully received first data packet to the SeNB1 in operation 1908a, and MAC/PHY layers of the eNB1 deliver the received ACK to the RLC/PDCP/RRC layers in operation 1908b. The MeNB receives a second data packet from the S-GW in operation 1909a and transmits the same to the UE through the SeNB1 in operations 1909b and 1909c. If the second data packet fails to be transmitted in operation 1910, the UE transmits a NACK to the MAC/PHY layers of the SeNB1 in operation 1911a, and the MAC/PHY layers of the SeNB1 deliver the received NACK to the RLC/PDCP/RRC layers of the MeNB in operation 1911b. The MAC/PHY layers of the SeNB1 retransmit the second data packet having failed to be transmitted to the UE. If the second data packet fails to be transmitted in operation 1912, the UE transmits a NACK to the MAC/PHY layers of the SeNB1 in operation 1913a, and the MAC/PHY layers of the SeNB1 deliver the received NACK to the RLC/PDCP/RRC layers of the MeNB in operation 1913b. In FIG. 19, it is assumed that transmission point change occurs in case of two consecutive data packet transmission failures. Thus, transmission point change is performed among the SeNB1, the SeNB2, the MeNB, and the S-GW in operation 1914, and the MeNB1 transmits the second data packet failing to be transmitted to the SeNB2 for retransmission of the second data packet in operation 1915a. The SeNB2 transmits the second data packet to the UE in operation 1915b. If successfully receiving the second data packet, the UE transmits an ACK to the SeNB2 in operation 1916a. Depending on a case, the SeNB2 forwards the ACK received from the UE to the MeNB in operation 1916b.

Thereafter, the MeNB receives third and fourth data packets from the S-GW and transmits the same to the UE through the SeNB2, and the UE transmits an ACK to the SeNB2 that delivers an ACK received from the UE to the MeNB in operations 1917a through 1920b. A transmission point change condition may change in various ways depending on service and system requirements. If eNBs have agreed to transmit an ACK or a NACK only in a particular condition, forwarding of the ACK or the NACK from the SeNB2 or the SeNB1 to the MeNB after transmission point change may be omitted. If a corresponding condition is satisfied, an ACK or a NACK for data packets may be transmitted at a time.

Figure 20:
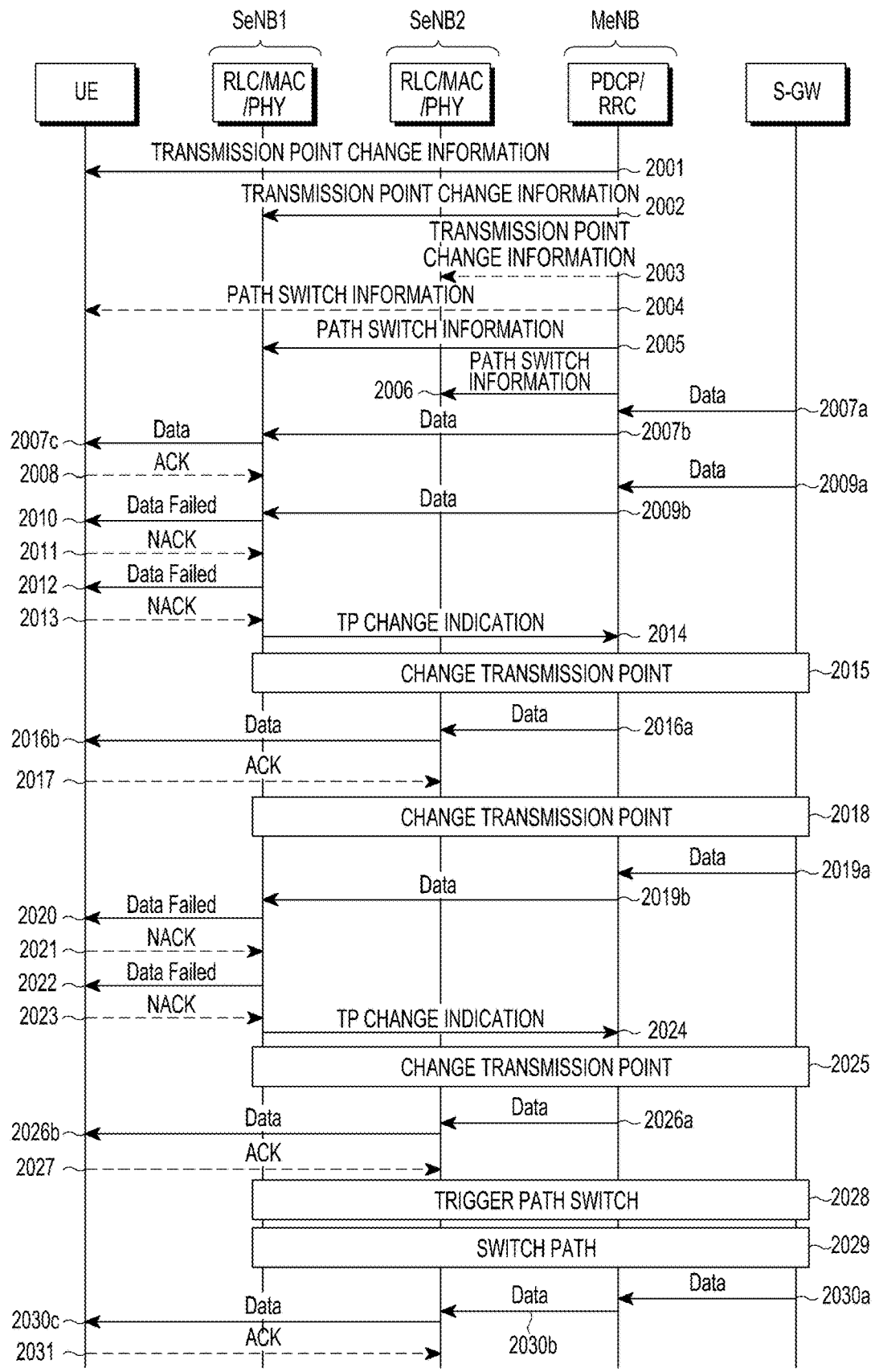
FIG. 20 illustrates transmission point change and path switch according to another embodiment of the present disclosure.

FIG. 20 illustrates transmission point change and path switch according to another embodiment of the present disclosure. In FIG. 20, the UE is assumed to connect to three eNBs. One of the eNBs may be an MeNB, and the other eNBs may be SeNBs. An operating frequency of the MeNB may be different from those of the SeNBs. For example, the MeNB may be an LTE eNB operating at a frequency lower than 6 GHz, and the SeNBs may be LTE eNBs operating at a frequency higher than or equal to 10 GHz. In this network, data transmission for a service needing a very high data rate may occur only by an SeNB supporting a higher data rate having a wide frequency spectrum in a higher frequency band. In particular, depending on an embodiment of the present disclosure, the MeNB may not have a PHY layer that actually manages data transmission. In FIG. 20, a 3GPP hierarchical structure where eNBs include PHY/MAC/RLC/PDCP layers is assumed, and in particular, it is assumed that only an MeNB has the RLC/PDCP layers and the SeNB only supports the MAC/PHY layers for multiple-eNB connection. Thus, data retransmission may be performed by one of eNBs to which a UE connects. RLC or HARQ ACK/NACK may be transmitted in an explicit or implicit manner. In addition, reception information for a plurality of data packets may be indicated using block ACK/NACK. While DL transmission is assumed in FIG. 20, application to an UL case may also be possible.

In FIG. 20, it is assumed that an eNB1 transmits data initially. The MeNB transmits transmission point change information to the SeNB1 and the UE in operations 2001 and 2002. The MeNB transmits path switch information to the SeNB1 and the SeNB2 in operations 2005 and 2006. Depending on a case, the MeNB transmits the transmission point change information to the SeNB in operation 2003, and transmits the path switch information to the UE in operation 2004. Also, depending on a case, the SeNB1 may transmit the transmission point change information and the path switch information to the UE and the SeNB2.

The MeNB receives a first data packet from an S-GW in operation 2007a and transmits the same to the UE through the SeNB1 in operations 2007b and 2007c. The UE transmits an ACK for the successfully received first data packet to the SeNB1 in operation 2008. The MeNB receives a second data packet from the S-GW in operation 2009a and transmits the same to the UE through the SeNB1 in operation 2009b. If failing to transmit the second data packet in operation 2010, the UE transmits a NACK to the RLC/MAC/PHY layers of the SeNB1 in operation 2011, and the RLC/MAC/PHY layers of the SeNB1 retransmit the second data packet to the UE. If failing to retransmit the second data packet in operation 2012, the UE transmits a NACK to the RLC/MAC/PHY layers of the SeNB1.

In FIG. 20, it is assumed that transmission point change occurs in case of two consecutive data packet transmission failures. Thus, the RLC/MAC/PHY layers of the SeNB1 having failed in data packet transmission twice consecutively transmit a TP change indication to the PDCP/RRC layers of the MeNB to enable retransmission of the MAC/RLC data packet by another SeNB (i.e., the SeNB2) in operation 2014. Thus, transmission point change is performed among the SeNB1, the SeNB2, the MeNB, and the S-GW in operation 2015, and the MeNB1 transmits the second data packet failing to be transmitted to the SeNB2 for retransmission of the second data packet in operation 2016a. The SeNB2 transmits the second data packet to the UE in operation 2016b. The retransmitted packet may be a MAC packet, an RLC packet, or a PDCP packet. If successfully receiving the second data packet, the UE transmits an ACK to the SeNB2 in operation 2017. The SeNB2 then determines that the second data packet is successfully transmitted, and performs transmission point change to the SeNB1 in operation 2018. The MeNB receives a third data packet from the S-GW in operation 2019a and transmits the same to the UE through the SeNB1 in operation 2019b. If failing to transmit the third data packet in operation 2020, the UE transmits a NACK to the RLC/MAC/PHY layers of the SeNB1 in operation 2021, and the RLC/MAC/PHY layers of the SeNB1 retransmit the third data packet to the UE. If failing to retransmit the third data packet in operation 2022, the UE transmits a NACK to the RLC/MAC/PHY layers of the SeNB1 in operation 2023.

The RLC/MAC/PHY layers of the SeNB1 having failed in data packet transmission twice consecutively transmit a TP change indication to the PDCP/RRC layers of the MeNB to enable data retransmission by another SeNB (i.e., the SeNB2) in operation 2024. Thus, transmission point change is performed among the SeNB1, the SeNB2, the MeNB, and the S-GW in operation 2025, and the MeNB1 transmits the third data packet failing to be transmitted to the SeNB2 for retransmission of the third data packet in operation 2026a. The SeNB2 transmits the third data packet to the UE in operation 2026b. If successfully receiving the third data packet, the UE transmits an ACK to the SeNB2 in operation 2027.

In FIG. 20, it is assumed that the path is switched if data packet transmission at the changed transmission point succeeds twice consecutively. Thus, the SeNB2 triggers path switch in operation 2028 after receiving the ACK for the second and fourth data packets and path switch is performed among the SeNB1, the SeNB2, the MeNB, and the S-GW in operation 2029. After path switch, the MeNB receives a new data packet for the UE from the S-GW in operation 2030a and delivers the same to the SeNB2 in operation 2030b, and the SeNB2 transmits the received new data packet to the UE in operation 2030c. If successfully receiving the new data packet, the UE transmits an ACK to the SeNB2 in operation 2031. A transmission point change condition and a path switch triggering condition may change in various ways depending on service and system requirements.

Figure 21:
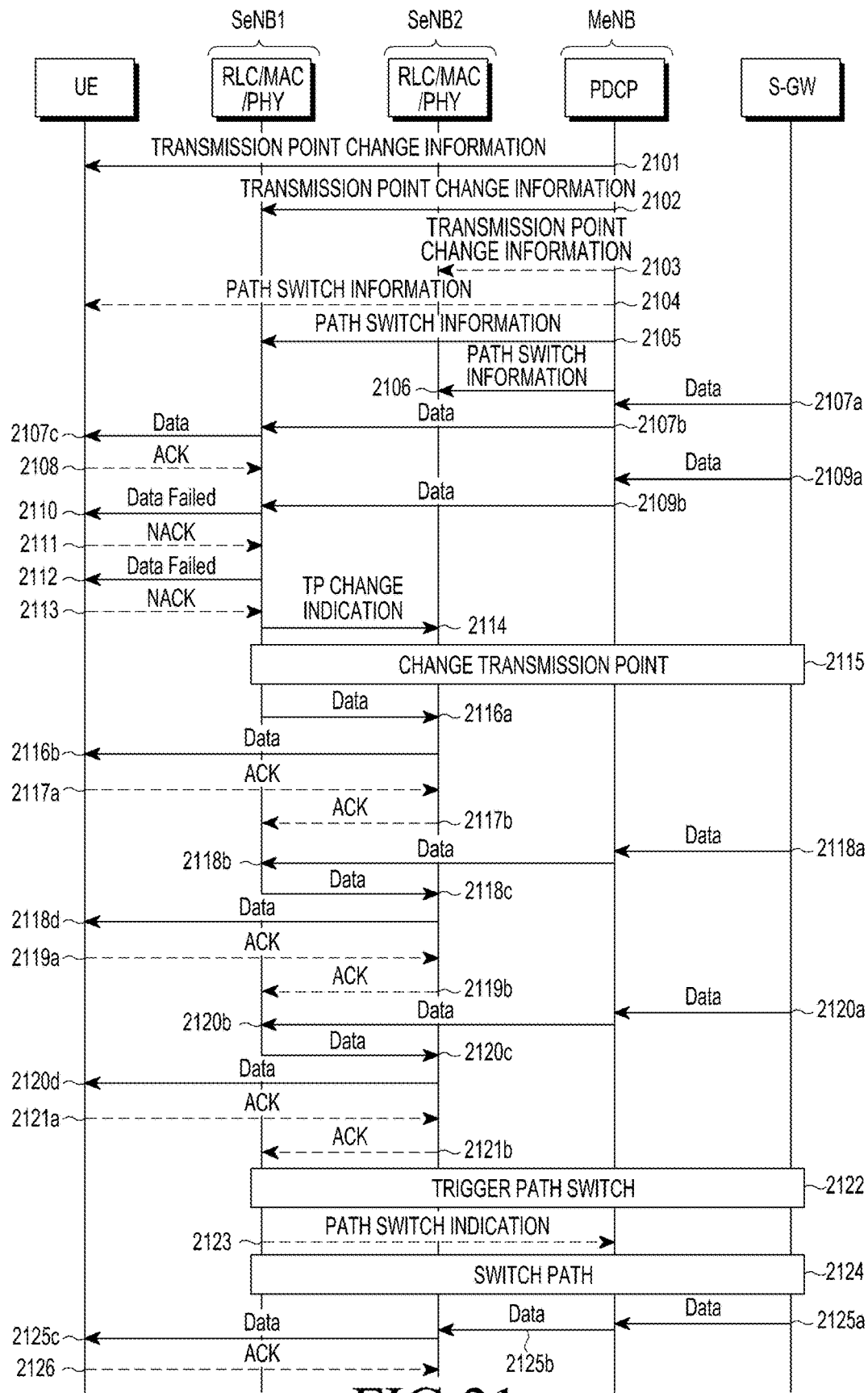
FIG. 21 illustrates transmission point change and path switch according to another embodiment of the present disclosure.

FIG. 21 illustrates transmission point change and path switch according to another embodiment of the present disclosure. In FIG. 21, the UE is assumed to connect to three eNBs. One of the eNBs may be an MeNB, and the other eNBs may be SeNBs. An operating frequency of the MeNB may be different from those of the SeNBs. For example, the MeNB may be an LTE eNB operating at a frequency lower than 6 GHz, and the SeNBs may be LTE eNBs operating at a frequency higher than or equal to 10 GHz. In this network, data transmission for a service needing a very high data rate may occur only by an SeNB supporting a higher data rate having a wide frequency spectrum in a higher frequency band. In particular, depending on an embodiment, the MeNB may not have a PHY layer that actually manages data transmission. In FIG. 21, a 3GPP hierarchical structure where eNBs include PHY/MAC/RLC/PDCP layers is assumed, and in particular, only an MeNB has the PDCP layer and the SeNB only supports the RLC/MAC/PHY layers for multiple-eNB connection. Thus, data retransmission may be performed by one of eNBs to which a UE connects. ACK/NACK may be transmitted in an explicit or implicit manner. In addition, reception information for a plurality of data packets may be indicated using block ACK/NACK. While DL transmission is assumed in FIG. 20, application to an UL case may also be possible.

In FIG. 21, it is assumed that an eNB1 transmits data initially. The MeNB transmits transmission point change information to the SeNB1 and the UE in operations 2101 and 2102. The MeNB transmits path switch information to the SeNB1 and the SeNB2 in operations 2105 and 2106. Depending on a case, the MeNB transmits the transmission point change information to the SeNB in operation 2103, and transmits the path switch information to the UE in operation 2104. Also, depending on a case, the SeNB1 may transmit the transmission point change information and the path switch information to the UE and the SeNB2.

The MeNB receives a first data packet from an S-GW in operation 2107a and transmits the same to the UE through the SeNB1 in operations 2107b and 2107c. The UE transmits an ACK for the successfully received first data packet to the SeNB1 in operation 2108. The MeNB receives a second data packet from the S-GW in operation 2109a and transmits the same to the UE through the SeNB1 in operation 2109b. If failing to transmit the second data packet in operation 2110, the UE transmits a NACK to the RLC/MAC/PHY layers of the SeNB1 in operation 2111, and the RLC/MAC/PHY layers of the SeNB1 retransmit the second data packet to the UE. If failing to retransmit the second data packet in operation 2112, the UE transmits a NACK to the RLC/MAC/PHY layers of the SeNB1 in operation 2123.

In FIG. 21, it is assumed that transmission point change occurs in case of two consecutive data packet transmission failures. Thus, the RLC/MAC/PHY layers of the SeNB1 having failed in data packet transmission twice consecutively transmit a TP change indication to the MeNB to enable retransmission of the data packet by another SeNB (i.e., the SeNB2) in operation 2114. Thus, transmission point change is performed among the SeNB1, the SeNB2, the MeNB, and the S-GW in operation 2115, and the SeNB1 transmits the second data packet failing to be transmitted to the SeNB2 for retransmission of the second data packet in operation 2116*a*. The SeNB2 retransmits the second data packet to the UE in operation 2116*b*. The retransmitted packet may be a MAC packet, an RLC packet, or a PDCP packet. If successfully receiving the second data packet, the UE transmits an ACK to the SeNB2 in operation 2117*a*. Depending on a case, the SeNB2 forwards the ACK received from the UE to the SeNB1 in operation 2117*b*.

The MeNB then transmits the third and fourth data packets received from the S-GW to the SeNB1 which then transmits the third and fourth data packets to the SeNB2 which then transmits the third and fourth data packets to the UE, and the UE transmits ACKs for the third and fourth data packets to the SeNB2, and depending on a case, the SeNB2 forwards the ACK to the SeNB1 in operations 2118*a* through 2121*b*.

In FIG. 21, it is assumed that the path is switched if data packet transmission at the changed transmission point succeeds three times consecutively. Thus, the SeNB2 triggers path switch in operation 2122 after receiving the ACK for the fourth data packet, and path switch is performed among the SeNB1, the SeNB2, the MeNB, and the S-GW in operation 2124. Depending on a case, the SeNB1 or the SeNB2 may transmit a path switch indication to the MeNB to inform that the path switch triggering condition is satisfied, in operation 2123. After path switch, the MeNB receives a new data packet for the UE from the S-GW in operation 2025*a* and delivers the same to the SeNB2 in operation 2025*b*, and the SeNB2 transmits the received new data packet to the UE in operation 2025*c*. If successfully receiving the new data packet, the UE transmits an ACK to the SeNB2 in operation 2026. A transmission point change condition and a path switch triggering condition may change in various ways depending on service and system requirements. If eNBs have agreed to transmit an ACK or a NACK only in a particular condition, forwarding of the ACK or the NACK from the SeNB2 to the SeNB1 after transmission point change may be omitted. If a corresponding condition is satisfied, an ACK or a NACK for data packets may be transmitted at a time.

Figure 22:
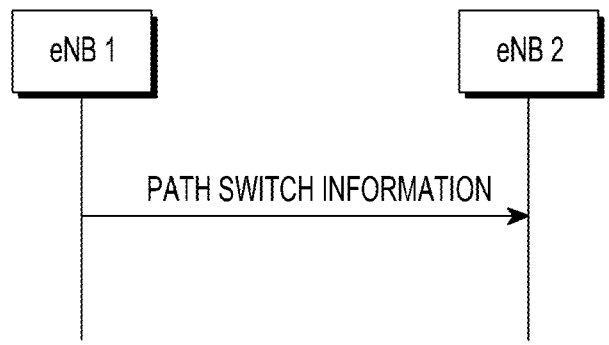
FIGS. 22 and 23 illustrate a process of transmitting path switch information according to an embodiment of the present disclosure.
Figure 23:
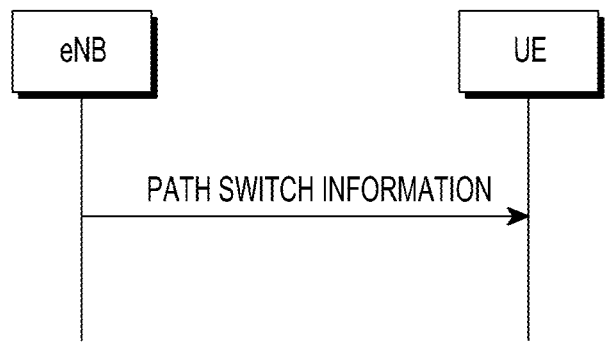

FIGS. 22 and 23 illustrate a process of transmitting path switch information according to an embodiment of the present disclosure, in which FIG. 22 illustrates transmission of path switch information from an eNB to another eNB and FIG. 23 illustrates transmission of path switch information from an eNB to a UE. To perform path switch, the path switch information may be exchanged between eNBs or an eNB and a UE. The path switch information may include rules for determining a path switch triggering condition. An eNB1 and an eNB2 in FIG. 22 and an eNB in FIG. 23 may be eNBs of a standalone network or MeNBs or SeNBs of a hierarchical network.

The path switch information may include eNB information described below. For example, when the current eNB1 is connected with a network path (i.e., a path is connected to transmit data from a GW or an MeNB to an eNB1), if the path switch condition is satisfied, the path is changed to the eNB2. Depending on a case, if the path switch condition is satisfied after path switch to the eNB2, which eNB is to be connected to the network path may be further indicated. The eNB information may be an eNB ID, a PCI, a TP ID, a TRP ID, a DU ID, etc.

The path switch information may include frequency or bandwidth information. In this case, the path switch information may also include UE ID information to be used in a switched eNB link, and an eNB-specific C-RNTI, etc., may also be used as a UE ID.

If an eNB for which a network path is to be switched is not determined, the path switch information may include a candidate eNB list to be used for the next path. Also in this case, the path switch information may include an ID of a candidate eNB, a UE ID to be used by a candidate eNB, and so forth. When a UE selects an eNB from among several candidates, the UE may perform a random access to notify the selected eNB of movement of the UE to the selected eNB. The transmission point change information may further provide an eNB selection condition, together with the candidate eNB list. For example, a signal strength and an expected transmission speed of an eNB, etc., may be provided. Alternatively, an eNB-specific priority may be provided.

The path switch condition may include conditions described below. The following conditions may be used alone or in combination of two or more. The transmission point change condition may include only indications of the following conditions.

if a predetermined number of consecutive HARQ failures are observed;

if a predetermined number of HARQ failures within a predetermined time are observed;

if a rate of HARQ failures is greater than or equal to a predetermined value;

if a predetermined number of consecutive ARQ NACKs are observed;

if a predetermined number of consecutive ARQ NACKs within a predetermined time are observed;

if a rate of ARQ failures is greater than or equal to a predetermined value; and if a frequency of an ARQ feedback (state report) is higher than or equal to a predetermined level.

Figure 24:
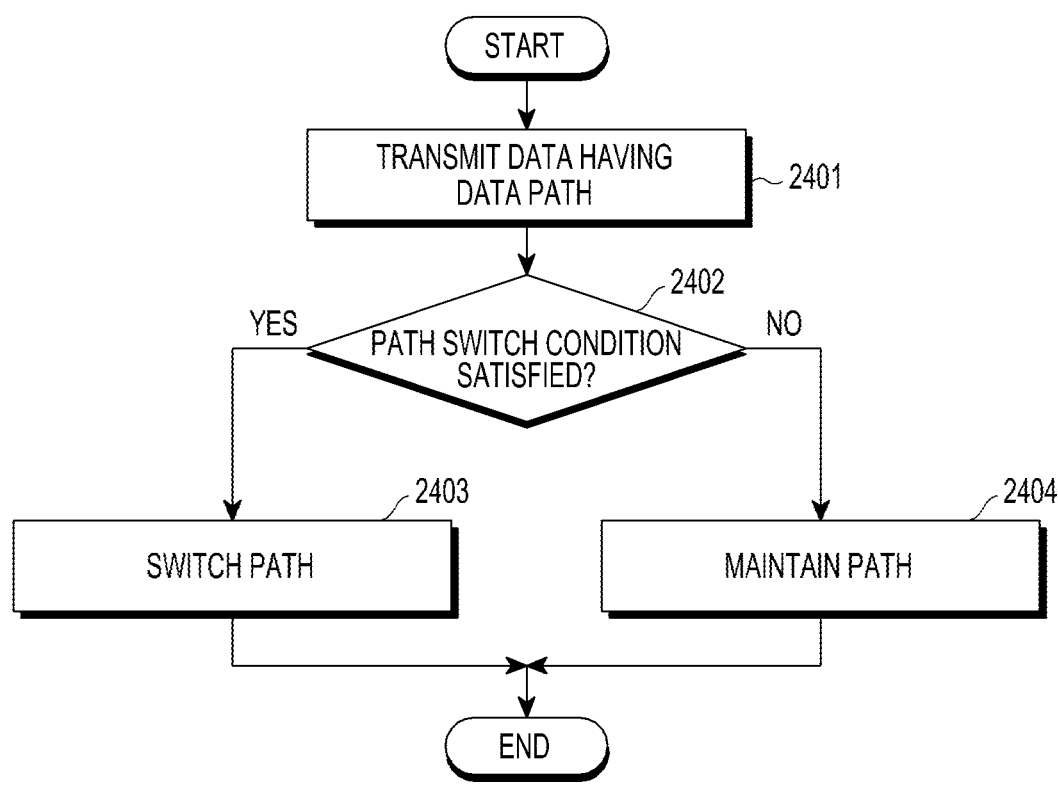
FIG. 24 is a flowchart of a procedure for switching a path according to an embodiment of the present disclosure.

FIG. 24 is a flowchart of a procedure for switching a path according to an embodiment of the present disclosure.

Referring to FIG. 24, a transmitter determines whether a data transmission/reception failure occurs during data transmission/reception with a receiver through one path in operation 2401. In an embodiment of the present disclosure, to determine a data transmission/reception failure, an ACK, a NACK, a CQI, an MCS, a link quality, an RSRP, an RSRQ, an RSSI, etc., may be used. A data reception failure for a DL may be regarded as a failure in data packet decoding, PDCCH decoding, or PDSCH decoding. A data reception failure for an UL may be regarded as occurring if an eNB fails in decoding a packet received from a UE, if power of an SRS is lower than a predetermined threshold value, or if the eNB may not detect the ACK/NACK of the UE for the PDSCH. If these types of data transmission/reception failures occur consecutively a predetermined number of times, the transmitter determines whether a path switch condition is satisfied in operation 2402.

If the path switch condition is satisfied, the transmitter switches a path according to a preset rule and transmits and receives data through a new path in operation 2403; if the path switch condition is not satisfied, the transmitter maintains the current path and transmits or receives data in operation 2404.

The transmission point change condition of FIG. 7 and the path switch condition of FIG. 24 may independently occur in the UE and the network (e.g., the eNB, the CU, the DU, the MeNB, and the SeNB). In an embodiment of the present disclosure, if the transmission point change or the path switch occurs, each operation may be reset. In another embodiment, only when the transmission point does not match the network path, it may be determined whether the path switch condition is satisfied. In another embodiment, only when the transmission point does not match the network path, it may be determined whether the transmission point change condition is satisfied.

Figure 25:
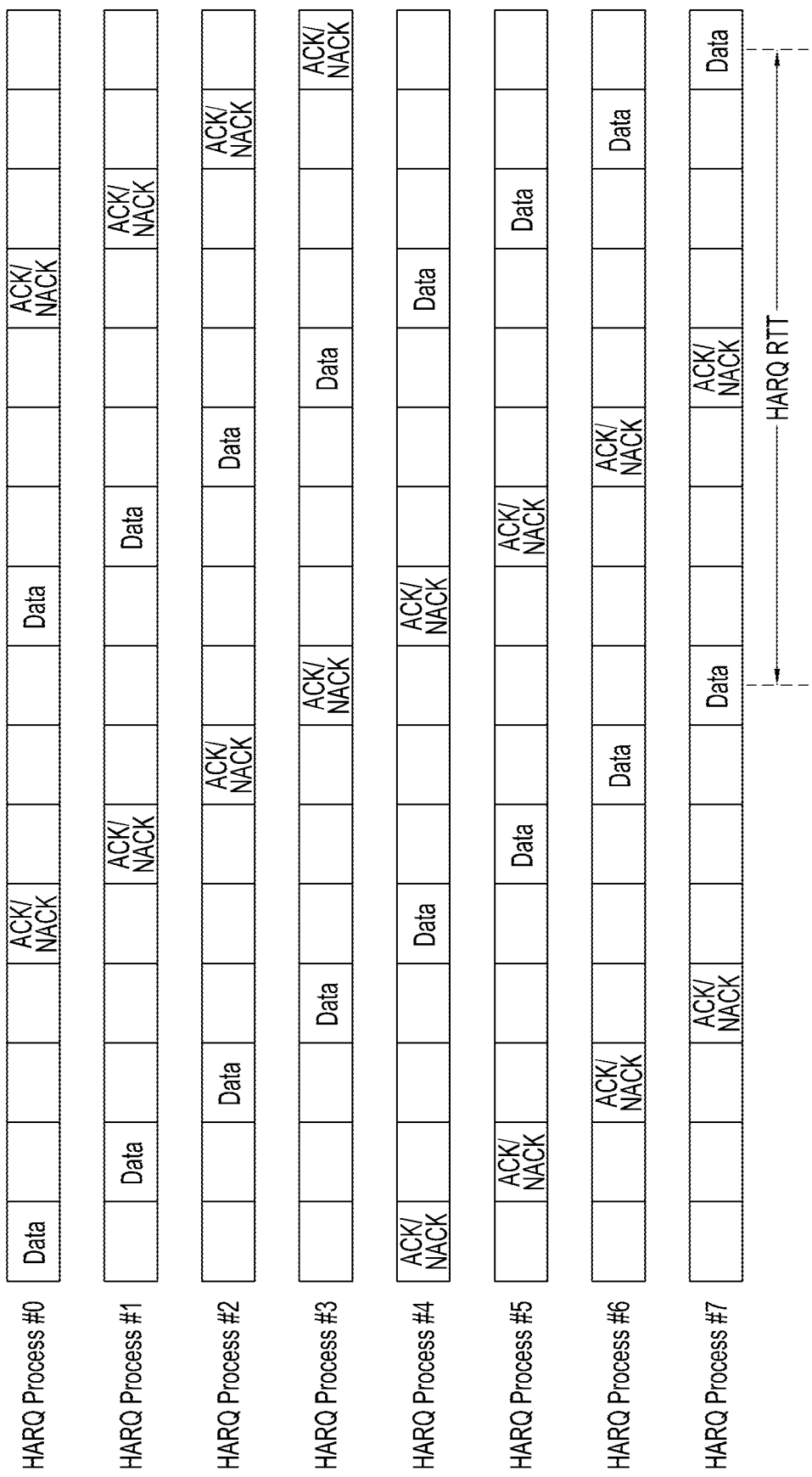
FIG. 25 illustrates a case to which an embodiment of the present disclosure is applied when an eNB has a plurality of HARQ processes.

FIG. 25 illustrates a case to which an embodiment of the present disclosure is applied when an eNB has a plurality of HARQ processes. In FIG. 25, the eNB has a total of eight HARQ processes, and the number of HARQ processes may change according to capabilities of a UE and a network, a TTI, an MIMO configuration, and an HARQ round trip time (RTT). As such, if the eNB has a plurality of HARQ processes, the transmission point change or the path switch based on an HARQ transmission result described in FIGS. 1 through 24 may be applied differently for each HARQ process. In an embodiment, the transmission point change or the path switch may occur based on the number of HARQ NACKs generated consecutively or inconsecutively for a time that is set for total HARQ processes. In another embodiment, the same transmission point change condition or path switch condition or different transmission point change conditions or path switch conditions may be applied for each HARQ process. The transmission point change condition or path switch condition may be set in an eNB or may be used according to rules pre-agreed in a network.

In particular, if the eNB operates with the plurality of HARQ processes, immediate transmission point change based on an HARQ ACK/NACK, influenced by an HARQ RTT including an HARQ feedback time and an HARQ retransmission time, may cause a data loss in the current on-going HARQ process. Thus, to minimize the data loss, even if the transmission point change condition is satisfied, the transmission point may be changed after the HARQ RTT or a predetermined time. The predetermined time may be notified from the eNB to the UE, together with the transmission point change condition or through a separate message.

Figure 26:
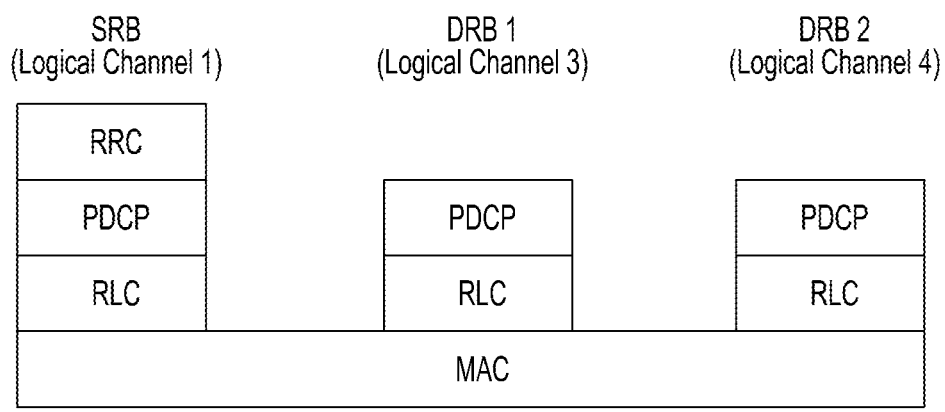
FIG. 26 illustrates an example of a protocol stack of a UE or an eNB according to an embodiment of the present disclosure.

FIG. 26 illustrates an example of a protocol stack of a UE or an eNB according to an embodiment of the present disclosure. The eNB may have a plurality of logical channels for one UE. Among the plurality of logical channels, a logical channel 1 may be a signaling radio bearer in charge of a control signal and other logical channels 3 and 4 may be data radio bearers in charge of data transmission and reception. Each logical channel may be mapped to a corresponding bearer. The UE may have a plurality of ARQ devices. In an embodiment of FIG. 26, an LTE protocol stack is assumed, and in this case, the ARQ devices exist on an RLC layer, and the UE may have a plurality of ARQ devices for each logical channel. Also in this case, the transmission point change or the path switch based on an ARQ transmission result described in FIGS. 1 through 24 may be applied differently for each ARQ device. In an embodiment, the transmission point change or path switch condition may be applied for all of the ARQ devices, and in another embodiment, the same transmission point change condition or path switch condition or different transmission point change conditions or path switch conditions may be applied to each ARQ device. The transmission point change condition or path switch condition may be set in an eNB or may be used according to rules pre-agreed in a network.

The transmission point change condition or path switch condition according to an embodiment of the present disclosure described above may be used in various modified forms or in combination according to requirements or specifications of a system.

Figure 27:
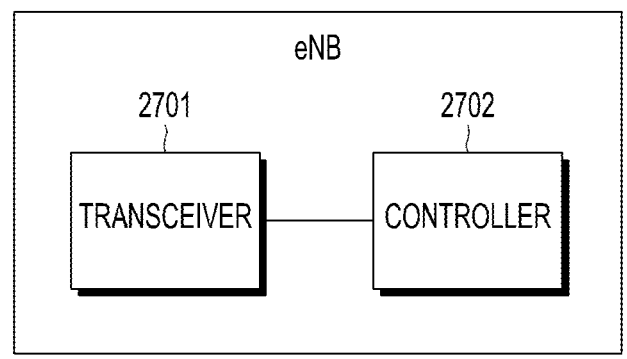
FIG. 27 is a block diagram of an eNB for performing transmission point change or path switch according to an embodiment of the present disclosure.

FIG. 27 is a block diagram of an eNB for performing transmission point change or path switch according to an embodiment of the present disclosure.

Referring to FIG. 27, the eNB may include a transceiver 2701 and a controller 2702, and the controller 2702 performs a series of operations for transmission point change or path switch according to at least one of the above-described embodiments of the present disclosure. The transceiver 2701 performs an operation of transmitting and receiving signaling, a signal, and a message for transmission point change or path switch according to at least one of the above-described embodiments of the present disclosure under control of the controller 2702. The eNB according to an embodiment of the present disclosure may further include a storage unit that stores various data, information, and parameters generated in the transceiver 2701 and the controller 2702.

Figure 28:
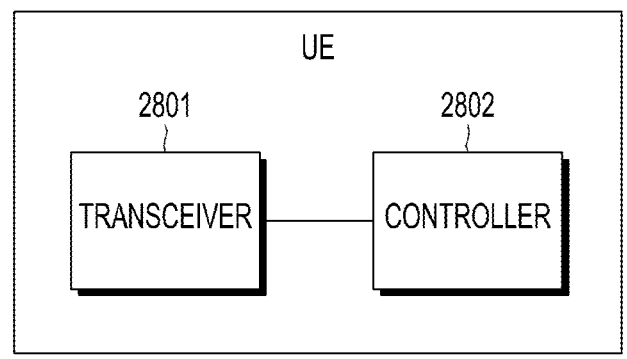
FIG. 28 is a block diagram of a UE for performing transmission point change or path switch according to an embodiment of the present disclosure.

FIG. 28 is a block diagram of a UE for performing transmission point change or path switch according to an embodiment of the present disclosure.

Referring to FIG. 28, the eNB may include a transceiver 2801 and a controller 2802, and the controller 2802 performs a series of operations for transmission point change or path switch according to at least one of the above-described embodiments of the present disclosure. The transceiver 2801 performs an operation of transmitting and receiving signaling, a signal, and a message for transmission point change or path switch according to at least one of the above-described embodiments of the present disclosure under control of the controller 2802. The eNB according to an embodiment of the present disclosure may further include a storage unit that stores various data, information, and parameters generated in the transceiver 2801 and the controller 2802.

Various embodiments of the present disclosure may be implemented with a computer-readable code on a computer-readable recording medium. The computer readable recording medium may be any type of data storage device that may store data readable by a computer system. Examples of record-mediums readable by the computer may include a read-only memory (ROM), a random-access memory (RAM), compact disk ROM (CD-ROM), magnetic tapes, floppy disks, optical data storage devices, carrier waves (such as data transmission through the Internet). The computer readable recording medium may be distributed through computer systems connected over a network, and thus the computer readable code is stored and executed in a decentralized manner. Further, functional programs, codes and code segments for achieving the present disclosure may be easily interpreted by programmers skilled in the art which the present disclosure pertains to.

The apparatus and method according to an embodiment of the present disclosure may be implemented by hardware, software, or a combination of hardware and software. Such software may be stored, whether or not erasable or re-recordable, in a volatile or non-volatile storage such as a read-only memory (ROM), a memory such as a random-access memory (RAM), a memory chip, a device, or an integrated circuit; and an optically or magnetically recordable and machine (e.g., computer)-readable storage medium such as a compact disc (CD), a digital versatile disk (DVD), a magnetic disk, or a magnetic tape. It can be seen that the method according to the present disclosure may be implemented by a computer or a portable terminal which includes a controller and a memory, and the memory is an example of a machine-readable storage medium which is suitable for storing a program or programs including instructions for implementing the embodiment of the present disclosure.

Accordingly, the present invention includes a program that includes a code for implementing the apparatus and method set forth in the appended claims of the specification and a machine (computer, etc.) readable storage medium for storing the program. The program may be electronically transferred through an arbitrary medium such as a communication signal delivered through a wired or wireless connection, and the present disclosure properly includes equivalents thereof.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

Meanwhile, embodiments disclosed in the present specification and drawings have been provided to easily describe the present disclosure and to help understanding of the present disclosure, and are not intended to limit the scope of the present disclosure. While the foregoing embodiments of the present disclosure have been shown and described as examples, it will be apparent to those of ordinary skill in the art that modifications and variations can be made without departing from the spirit and scope of the embodiments as defined by the appended claims. Therefore, the true technical scope of the present disclosure should be defined by the appended claims.

The invention claimed is:

1. A method for receiving data, by a user equipment (UE), in a wireless communication system, the method comprising:
   receiving, from a first evolved NodeB (eNB) connected with a gateway (GW), first information related to a transmission point change;
   receiving, through a second eNB, first data which is transmitted from the first eNB;
   identifying a failure in data reception from the second eNB;
   changing a transmission point from the second eNB to a third eNB based on the first information; and
   receiving, through the third eNB, second data having failed to be received from the second eNB.

2. The method of claim 1, further comprising:
   receiving, from the first eNB, second information related to a path switch before the transmission point change;
   identifying that reception of the second data is successful;
   switching a path from the second eNB to the third eNB based on the second information; and
   receiving third data transmitted from the first eNB.

3. The method of claim 2, wherein the second information comprises information indicating switch of the path if a predetermined number of consecutive data transmission failures occur in the path, if a predetermined number of data transmission failures occur within a predetermined time in the path, or if a rate of data transmission failures is greater than or equal to a predetermined value in the path.

4. The method of claim 1, wherein the first information comprises information indicating change of the transmission point if a predetermined number of consecutive data transmission failures occur at the transmission point, if a predetermined number of data transmission failures occur within a predetermined time at the transmission point, or if a rate of data transmission failures is greater than or equal to a predetermined value at the transmission point.

5. A method for transmitting data, by a first evolved NodeB (eNB) connected with a gateway (GW), in a wireless communication system, the method comprising:
   transmitting, to a second eNB and a user equipment (UE), first information related to a transmission point change;
   receiving first data from the GW, and transmitting the first data to the UE through the second eNB;
   identifying a failure in data transmission from the second eNB to the UE;
   changing a transmission point from the second eNB to a third eNB based on the first information; and
   transmitting second data having failed to be transmitted to the UE, through the third eNB.

6. The method of claim 5, further comprising:
   transmitting, to the second eNB and the third eNB, second information related to a path switch before the transmission point change;
   identifying that transmission of the second data is successful;
   switching a path from the second eNB to the third eNB based on the second information; and
   receiving third data from the GW, and transmitting the third data to the UE through the third eNB.

7. The method of claim 6, wherein the second information comprises information indicating switch of the path if a predetermined number of consecutive data transmission failures occur in the path, if a predetermined number of data transmission failures occur within a predetermined time in the path, or if a rate of data transmission failures is greater than or equal to a predetermined value in the path.

8. The method of claim 5, wherein the first information comprises information indicating change of the transmission point if a predetermined number of consecutive data transmission failures occur at the transmission point, if a predetermined number of data transmission failures occur within a predetermined time at the transmission point, or if a rate of data transmission failures is greater than or equal to a predetermined value at the transmission point.

9. A user equipment (UE) for receiving data in a wireless communication system, the UE comprising:
   a transceiver; and
   at least one processor configured to control the transceiver to receive, from a first evolved NodeB (eNB) connected with a gateway (GW), first information related to a transmission point change, to control the transceiver to receive, through a second eNB, first data which is transmitted from the first eNB, to identify a failure in data reception from the second eNB, to change a transmission point from the second eNB to a third eNB based on the first information, and to control the transceiver to receive, through the third eNB, second data having failed to be received from the second eNB.

10. The UE of claim 9, wherein the transceiver is configured to receive, from the first eNB, second information related to a path switch before the transmission point change,
   wherein the at least one processor is configured to identify that reception of the second data is successful, and to switch a path from the second eNB to the third eNB based on the second information, and wherein the transceiver is configured to receive third data transmitted from the first eNB, through the third eNB.

11. The UE of claim 10, wherein the second information comprises information indicating switch of the path if a predetermined number of consecutive data transmission failures occur in the path, if a predetermined number of data transmission failures occur within a predetermined time in the path, or if a rate of data transmission failures is greater than or equal to a predetermined value in the path.

12. The UE of claim 9, wherein the first information comprises information indicating change of the transmission point if a predetermined number of consecutive data transmission failures occur at the transmission point, if a predetermined number of data transmission failures occur within a predetermined time at the transmission point, or if a rate of data transmission failures is greater than or equal to a predetermined value at the transmission point.

13. A first evolved NodeB (eNB) for transmitting data in a wireless communication system, the first NB comprising:

a transceiver; and at least one processor configured to control the transceiver to transmit, to a second eNB and a user equipment (UE), first information related to a transmission point change, to control the transceiver to receive first data from a gateway (GW), and to transmit the first data to the UE through the second eNB, to identify a failure in data transmission from the second eNB to the UE, to change a transmission point from the second eNB to a third eNB based on the first information, and control the transceiver to transmit second data having failed to be transmitted to the UE, through the third eNB.

14. The first eNB of claim 13, wherein the transceiver is configured to transmit, to the second eNB and the third eNB, second information related to a path switch before the transmission point change, wherein the at least one processor is configured to identify that transmission of the second data is successful, and to switch a path from the second eNB to the third eNB based on the second information, and wherein the transceiver is configured to receive third data from the GW, and transmit the third data to the UE through the third eNB.

15. The first eNB of claim 14, wherein the second information comprises information indicating switch of the path if a predetermined number of consecutive data transmission failures occur in the path, if a predetermined number of data transmission failures occur within a predetermined time in the path, or if a rate of data transmission failures is greater than or equal to a predetermined value in the path.

16. The first eNB of claim 13, wherein the first information comprises information indicating change of the transmission point if a predetermined number of consecutive data transmission failures occur at the transmission point, if a predetermined number of data transmission failures occur within a predetermined time at the transmission point, or if a rate of data transmission failures is greater than or equal to a predetermined value at the transmission point.

* * * * *